US00RE43165E

(19) United States
(12) Reissued Patent
Utz et al.

(10) Patent Number: US RE43,165 E
(45) Date of Reissued Patent: Feb. 7, 2012

(54) CARD SHEET CONSTRUCTION

(75) Inventors: Martin Utz, Gmund (DE); Karl Lengfeller, Groβkarolinenfeld/Tattenhause (DE); Michael Wilkes, Arzbach (DE); Chia-Hsi Chu, Arcadia, CA (US); Ramin Heydarpour, Beverly Hills, CA (US); Sriram Venkatasanthanam, Chino Hills, CA (US); Ronald Ugolick, San Dimas, CA (US); Ali R. Mehrabi, Los Angeles, CA (US)

(73) Assignees: Avery Dennison Corporation, Pasadena, CA (US); Avery Dennison Zweckform Office Products Europe GmbH (DE)

(21) Appl. No.: 13/006,897

(22) Filed: Jan. 14, 2011

Related U.S. Patent Documents

Reissue of:
(64) Patent No.: 7,514,134
Issued: Apr. 7, 2009
Appl. No.: 10/233,283
Filed: Aug. 28, 2002

(30) Foreign Application Priority Data

Aug. 28, 2001 (DE) ..... 101 42 043

(51) Int. Cl.
*B32B 3/00* (2006.01)

(52) U.S. Cl. ..... 428/43; 428/136

(58) Field of Classification Search ..... 428/43, 428/136, 195.1
See application file for complete search history.

(56) References Cited

U.S. PATENT DOCUMENTS

| | | | |
|---|---|---|---|
| 1,949,259 | A | 2/1934 | Salsman |
| 2,166,352 | A | 7/1939 | Hamilton |
| 2,434,545 | A | 1/1948 | Brady, Jr. et al. |
| 3,038,597 | A | 6/1962 | Brady, Jr. |
| 3,072,024 | A | 1/1963 | Wengel |
| 3,568,829 | A | 3/1971 | Brady, Jr. |
| 3,896,246 | A | 7/1975 | Brady, Jr. |
| 3,985,927 | A | 10/1976 | Norris et al. |
| 4,048,736 | A | 9/1977 | Castleman et al. |
| 4,128,430 | A | 12/1978 | Newman et al. |
| 4,264,662 | A | 4/1981 | Taylor et al. |
| 4,380,564 | A | 4/1983 | Cancio et al. |
| 4,397,704 | A | 8/1983 | Frick |
| 4,428,857 | A | 1/1984 | Taylor et al. |

(Continued)

FOREIGN PATENT DOCUMENTS

DE 19519584 12/1996

(Continued)

OTHER PUBLICATIONS

International Search Report dated Jan. 3, 2003 in re International Application No. PCT/US2002/27518.

(Continued)

*Primary Examiner* — Alexander Thomas
(74) *Attorney, Agent, or Firm* — Rankin, Hill & Clark LLP

(57) ABSTRACT

A card sheet including a top material having punched lines, the front side of the top material being printable. A carrier material of at least one polymer layer is directly applied as by extruding to the back side of the top material. The polymer has a stress-at-break in the range of 10 to 30 MPa and an elongation at break in the range of 10 to 120%. From the card sheet individual cards may be broken out to form high quality calling (business) cards, photograph cards, post cards or the like.

78 Claims, 7 Drawing Sheets

U.S. PATENT DOCUMENTS

| | | | |
|---|---|---|---|
| 4,465,729 | A | 8/1984 | Cancio et al. |
| 4,732,069 | A | 3/1988 | Wood et al. |
| 4,863,772 | A | 9/1989 | Cross |
| 4,873,643 | A | 10/1989 | Powell et al. |
| 4,910,070 | A | 3/1990 | Al'Hariri |
| 5,007,191 | A | 4/1991 | Klein |
| 5,087,405 | A | 2/1992 | Maker |
| 5,090,733 | A | 2/1992 | Bussiere |
| 5,198,275 | A | 3/1993 | Klein |
| 5,238,269 | A | 8/1993 | Levine |
| 5,275,868 | A | 1/1994 | Popat et al. |
| 5,284,689 | A | 2/1994 | Laurash et al. |
| 5,296,279 | A | 3/1994 | Birnbaum et al. |
| 5,366,250 | A | 11/1994 | Sunabe |
| 5,407,893 | A | 4/1995 | Koshizuka et al. |
| 5,530,793 | A | 6/1996 | Watkins |
| 5,560,966 | A | 10/1996 | Kishimoto et al. |
| 5,571,587 | A | 11/1996 | Bishop et al. |
| 5,665,504 | A | 9/1997 | Malhotra |
| 5,702,789 | A | 12/1997 | Fernandez-Kirchberger et al. |
| 5,727,817 | A | 3/1998 | Kraige |
| 5,830,529 | A | 11/1998 | Ross |
| 5,853,837 | A | 12/1998 | Popat |
| 5,861,201 | A | 1/1999 | Blackwelder et al. |
| 5,914,165 | A | 6/1999 | Freedman |
| 5,936,227 | A | 8/1999 | Truggelmann et al. |
| 5,993,928 | A | 11/1999 | Popat |
| 5,997,680 | A | 12/1999 | Popat |
| 6,016,618 | A | 1/2000 | Attia et al. |
| 6,039,356 | A | 3/2000 | Warther et al. |
| 6,159,568 | A | 12/2000 | Freedman et al. |
| 6,164,851 | A | 12/2000 | Sakamoto et al. |
| 6,173,649 | B1 | 1/2001 | Onishi |
| 6,284,708 | B1 | 9/2001 | Oshima et al. |
| 6,308,630 | B1 | 10/2001 | Kurokawa et al. |
| 6,358,587 | B1 | 3/2002 | Saint et al. |
| 6,380,132 | B1 | 4/2002 | Mihara et al. |
| 6,827,373 | B2 | 12/2004 | Zumberge |
| 7,377,996 | B2 | 5/2008 | Bilodeau |
| 7,514,134 | B2 | 4/2009 | Utz et al. |
| 7,579,076 | B2 | 8/2009 | Ishikawa |
| 2001/0003609 | A1 | 6/2001 | Takada et al. |
| 2001/0006714 | A1 | 7/2001 | Bull et al. |
| 2001/0007703 | A1 | 7/2001 | Weirather et al. |
| 2001/0036525 | A1 | 11/2001 | Yokokawa |
| 2002/0178940 | A1 | 12/2002 | Kitchin et al. |
| 2003/0148056 | A1 | 8/2003 | Utz et al. |
| 2003/0232191 | A1 | 12/2003 | Ishikawa |
| 2004/0018305 | A1 | 1/2004 | Pagano et al. |
| 2004/0209029 | A1 | 10/2004 | Utz et al. |
| 2005/0087977 | A1 | 4/2005 | Crum |
| 2005/0089664 | A1 | 4/2005 | Utz et al. |
| 2005/0095388 | A1 | 5/2005 | Utz et al. |
| 2005/0175807 | A1 | 8/2005 | Bilodeau |
| 2005/0208254 | A1 | 9/2005 | Yokokawa |
| 2006/0028015 | A1 | 2/2006 | Ray |
| 2006/0035020 | A1 | 2/2006 | Hennen |
| 2006/0286335 | A1 | 12/2006 | Utz et al. |
| 2007/0114789 | A1 | 5/2007 | Morrish |
| 2007/0196623 | A1 | 8/2007 | Bilodeau et al. |
| 2007/0275204 | A1 | 11/2007 | Ugolick |

FOREIGN PATENT DOCUMENTS

| | | |
|---|---|---|
| DE | 298 05 481 | 8/1998 |
| DE | 29805481 | 9/1998 |
| DE | 29907361 | 3/2000 |
| DE | 19945254 | 8/2001 |
| DE | 10142043.9 | 4/2003 |
| DE | 69909841 | 5/2004 |
| EP | 0894621 | 2/1999 |
| EP | 0987195 | 3/2000 |
| EP | 0987670 | 3/2000 |
| EP | 1274619 | 1/2003 |
| EP | 0894621 | 7/2006 |
| FR | 1.586.336 | 2/1970 |
| FR | 1586336 | 2/1970 |
| FR | 2797607 | 2/2001 |
| JP | 05318672 | 12/1993 |
| JP | 2000301843 | 10/2000 |
| JP | 2003301843 A | 10/2002 |
| JP | 200417541 | 1/2004 |
| JP | 2004017541 | 1/2004 |
| WO | WO 00/32412 | 11/1999 |
| WO | 00/13888 | 3/2000 |
| WO | 00/16978 | 3/2000 |
| WO | 00/32412 | 6/2000 |
| WO | 00/46316 | 8/2000 |
| WO | 01/10701 | 2/2001 |
| WO | WO 01/10701 A2 | 8/2001 |

OTHER PUBLICATIONS

Final Office Action dated Dec. 5, 2008 in U.S. Appl. No. 11/703,895.
Amendment dated Dec. 10, 2008 in U.S. Appl. No. 10/990,306.
Amendment dated Dec. 10, 2008 in U.S. Appl. No. 10/841,072.
Notice of Allowance and Fees Due dated Dec. 18, 2008 in U.S. Appl. No. 11/510,636.
Request for Reinstatement dated Dec. 22, 2008 in Canadian Application No. 2,459,036.
Office Action dated Dec. 30, 2008 in U.S. Appl. No. 10/990,306.
Non-final Office Action dated Jan. 8, 2009 in U.S. Appl. No. 11/923,432.
Non-final Office Action dated Jan. 9, 2009 in U.S. Appl. No. 11/001,560.
Supplemental Notice of Allowability dated Jan. 12, 2009 in U.S. Appl. No. 11/510,636.
Notice of Reinstatement dated Jan. 22, 2009 in Canadian Application No. 2,459,036.
Response dated Jan. 26, 2009 in U.S. Appl. No. 11/923,432.
Notice of Intent to Grant dated Jan. 27, 2009 in corresponding European Application No. 02766164.4.
Response dated Jan. 27, 2009 in U.S. Appl. No. 10/990,306.
Response dated Jan. 28, 2009 in U.S. Appl. No. 11/001,560.
Issue Notice dated Feb. 18, 2009 in U.S. Appl. No. 11/510,636.
Response dated Mar. 2, 2009 in Chinese Patent Application No. 200610135564.1.
Notice of Allowance dated Mar. 10, 2009 in U.S. Appl. No. 11/001,560.
Non-final Office Action dated Mar. 18, 2009 in U.S. Appl. No. 10/841,072.
Notice of Allowance dated Mar. 20, 2009 in U.S. Appl. No. 10/990,306.
Notice of Acceptance dated Apr. 30, 2009 in Australian Application No. 2002329910.
Office Action dated Apr. 3, 2009 in Chinese Application No. 200610135564.1.
Amendment dated Apr. 9, 2009 in Australian Application No. 2002/329910.
Response dated Apr. 16, 2009 in U.S. Appl. No. 10/841,072.
Notice of Allowance dated Apr. 22, 2009 in Mexican Application No. 2004/001936.
Issue Notice dated Apr. 22, 2009 in U.S. Appl. No. 10/990,306.
Issue Notice dated Apr. 29, 2009 in U.S. Appl. No. 11/001,560.
Decision to Grant dated Jun. 12, 2009 in European Application No. 02766164.4.
Response dated Jun. 17, 2009 in Chinese Application No. 200610135564.1.
Notice of Abandonment dated Jul. 10, 2009 in U.S. Appl. No. 11/703,895.
Amendment dated Aug. 11, 2009 in U.S. Appl. No. 11/923,432.
Final Office Action dated Aug. 21, 2009 in U.S. Appl. No. 10/841,072.
Office Action dated Aug. 14, 2009 in Chinese Application No. 200610135564.1.
Response dated Oct. 28, 2009 in Chinese Application No. 200610135564.1.
Amendment dated Nov. 23, 2009 in U.S. Appl. No. 10/841,072.
Miscellaneous Action dated Dec. 9, 2009 in U.S. Appl. No. 11/923,432.
Amendment dated Dec. 15, 2009 in U.S. Appl. No. 11/923,432.

Non-final Office Action dated Jan. 6, 2010 in U.S. Appl. No. 10/841,072.
Office Action dated Jan. 8, 2010 in Chinese Application No. 200610135564.1.
Amendment dated Jan. 12, 2010 in U.S. Appl. No. 10/841,072.
Notice of Allowance and Fees Due dated Feb. 9, 2010 in U.S. Appl. No. 11/923,432.
Notice of Allowance dated Feb. 25, 2010 in Canadian Application No. 2,459,036.
Response dated Mar. 22, 2010 in Chinese Application No. 200610135564.1.
Issue Notification dated Mar. 31, 2010 in U.S. Appl. No. 11/923,432.
Non-final Office Action dated Apr. 16, 2010 in U.S. Appl. No. 10/841,072.
Office Action dated May 4, 2010 in Chinese Application No. 200610135564.1.
Response dated Jul. 15, 2010 in Chinese Application No. 200610135564.1.
Amendment dated Oct. 18, 2010 in U.S. Appl. No. 10/841,072.
Request for Reinstatement dated Nov. 1, 2010 in Canadian Application No. 2,459,036.
Notice of Reinstatement dated Nov. 18, 2010 for Canadian Application No. 2,459,036.
Office Action dated Jul. 19, 2007 in U.S. Appl. No. 10/990,306.
Office Action dated Aug. 15, 2008 in Chinese Application No. 200610135564.1.
U.S. Appl. No. 09/801,187 Office Action dated Jun. 10, 2002.
U.S. Appl. No. 09/801,187 Office Action dated Mar. 11, 2003.
U.S. Appl. No. 09/801,187 Office Action dated Sep. 9, 2003.
U.S. Appl. No. 09/801,187 Office Action dated May 27, 2004.
U.S. Appl. No. 09/801,187 Office Action dated Sep. 14, 2004.
U.S. Appl. No. 09/801,187 Office Action dated Feb. 9, 2006.
U.S. Appl. No. 09/801,187 Office Action dated Oct. 12, 2006.
U.S. Appl. No. 09/801,187 Office Action dated May 3, 2007.
U.S. Appl. No. 09/801,187 Office Action dated Jan. 28, 2008.
U.S. Appl. No. 09/801,187 Office Action dated Jun. 3, 2008.
U.S. Appl. No. 09/801,187 Office Action dated Dec. 4, 2008.
U.S. Appl. No. 11/510,636 Office Action dated Dec. 7, 2007.
U.S. Appl. No. 11/510,636 Office Action dated Jul. 19, 2007.
U.S. Appl. No. 11/134,724 Office Action dated May 14, 2008.
U.S. Appl. No. 11/134,724 Office Action dated Feb. 6, 2008.
U.S. Appl. No. 11/134,724 Office Action dated Sep. 27, 2007.
U.S. Appl. No. 11/134,724 Office Action dated Apr. 17, 2007.
U.S. Appl. No. 11/134,754 Office Action dated Sep. 14, 2006.
U.S. Appl. No. 10/841,072 Office Action dated Jun. 15, 2007.
U.S. Appl. No. 10/841,072 Office Action dated Sep. 24, 2007.
U.S. Appl. No. 10/841,072 Office Action dated Sep. 18, 2008.
U.S. Appl. No. 10/990,306 Office Action dated Jun. 6, 2005.
U.S. Appl. No. 10/990,306 Office Action dated Jul. 19, 2005.
U.S. Appl. No. 10/990,306 Office Action dated Aug. 12, 2005.
U.S. Appl. No. 10/990,306 Office Action dated Nov. 15, 2005.
U.S. Appl. No. 10/990,306 Office Action dated Feb. 1, 2006.
U.S. Appl. No. 10/990,306 Office Action dated Jun. 27, 2006.
U.S. Appl. No. 10/990,306 Office Action dated Oct. 13, 2006.
U.S. Appl. No. 10/990,306 Office Action dated Feb. 13, 2007.
U.S. Appl. No. 10/990,306 Office Action dated May 30, 2007.
U.S. Appl. No. 10/990,306 Office Action dated Dec. 10, 2007.
U.S. Appl. No. 10/990,306 Office Action dated Jul. 19, 2007.
U.S. Appl. No. 10/990,306 Office Action dated Jul. 10, 2008.
U.S. Appl. No. 11/001,560 Office Action dated Jul. 6, 2006.
U.S. Appl. No. 11/001,560 Office Action dated Sep. 1, 2006.
U.S. Appl. No. 11/001,560 Office Action dated Oct. 11, 2006.
U.S. Appl. No. 11/001,560 Office Action dated Apr. 17, 2007.
U.S. Appl. No. 11/001,560 Office Action dated Jul. 19, 2007.
U.S. Appl. No. 11/001,560 Office Action dated Dec. 10, 2007.
U.S. Appl. No. 11/001,560 Office Action dated Mar. 11, 2008.
U.S. Appl. No. 11/001,560 Office Action dated Jun. 24, 2008.
U.S. Appl. No. 11/134,724 Office Action dated Apr. 3, 2006.
U.S. Appl. No. 11/134,724 Office Action dated Jun. 1, 2006.
U.S. Appl. No. 11/510,636 Office Action dated Apr. 21, 2008.
U.S. Appl. No. 11/510,636 Office Action dated Jul. 1, 2008.
U.S. Appl. No. 11/703,895 Office Action dated Jul. 19, 2007.
U.S. Appl. No. 11/703,895 Office Action dated Nov. 13, 2007.
U.S. Appl. No. 11/703,895 Office Action dated May 5, 2008.
U.S. Appl. No. 11/703,895 Office Action dated Jul. 11, 2008.
U.S. Appl. No. 11/703,895 Office Action dated Dec. 5, 2008.
U.S. Appl. No. 11/923,432 Office Action dated Aug. 19, 2008.
Australian Appln No. 2002329910 Examination Report dated Nov. 14, 2007.
Canadian Appln No. 2459036 Examination Report dated Jun. 22, 2007.
Chinese Appln No. 028214382 Office Action dated Nov. 18, 2005 with English Translation.
International Appln No. PCT/US2002/27518 International Preliminary Examination Report dated Dec. 19, 2003.
European Appln No. 02766164 Examination Report dated Jul. 30, 2007.
European Appln No. 02766164.4 Supplemental Search Report dated Oct. 26, 2006.
European Patent Office, Summons to Attend Oral Proceedings re EP Appln No. 02766164.4 dated Mar. 12, 2008, 4pp.
French Appln No. 0108593 Search Report dated Sep. 17, 2002.
German Appln No. 10127654.0 Office Action dated Oct. 17, 2005 with English Translation.
Great Britain Appln No. 01137744 Examination Report dated Apr. 20, 2004.
Great Britain Appln No. 01137744 Examination Report dated Oct. 25, 2004.
Great Britain Appln No. 01137744 Examination Report dated Nov. 2, 2005.
Great Britain Appln No. 01137744 Search Report dated Dec. 17, 2001.
International Appln No. PCT/US2002/27518 International Search Report dated Jan. 3, 2003.
International Appln No. PCT/US2002/27518 Written Opinion dated Jul. 25, 2003.
European Patents Office, Summons to Attend Oral Proceedings re EP Appln No. 02766164.4 dated Mar. 12, 2008, 4pp.
Australian Patent Office, Examiner's First Report re AU Appln. No. 2002329910, dated Nov. 14, 2007, 1pg.
Canadian Intellectual Property Office, Office Action re CA Appln. No. 2459036 dated Jun. 22, 2007, 3pp.
IPEA/US, International Preliminary Examination Report re Int'l Appln. No. PCT/US2002/27518 dated Dec. 19, 2003, 5pp.
IPEA/US, Written Opinion re Intl'l Appln. No. PCT/US2002/27518 dated Jul. 25, 2003, 4pp.
Chinese Patent Office, First Office Action re Chinese Appln. No. 02821438.2 (including English translation) dated Nov. 18, 2005, 16pp.
Office Action dated Dec. 4, 2008 from related U.S. Appl. No. 09/801,187.
Office Action dated Dec. 5, 2008 from related U.S. Appl. No. 11/703,895.
Office Action dated Aug. 15, 2008 from corresponding Chinese Application No. 2006-101355641.
Office Action dated Jul. 30, 2007 from corresponding European Application No. 0276616.4.
Supplemental Search Report dated Oct. 26, 2006 from corresponding European Application No. 0276616.4.

FIG. 12
B =
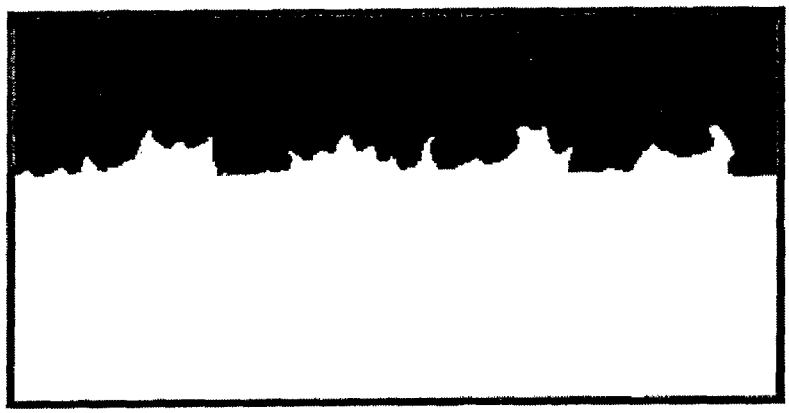
C = A - B =
D = ~C =
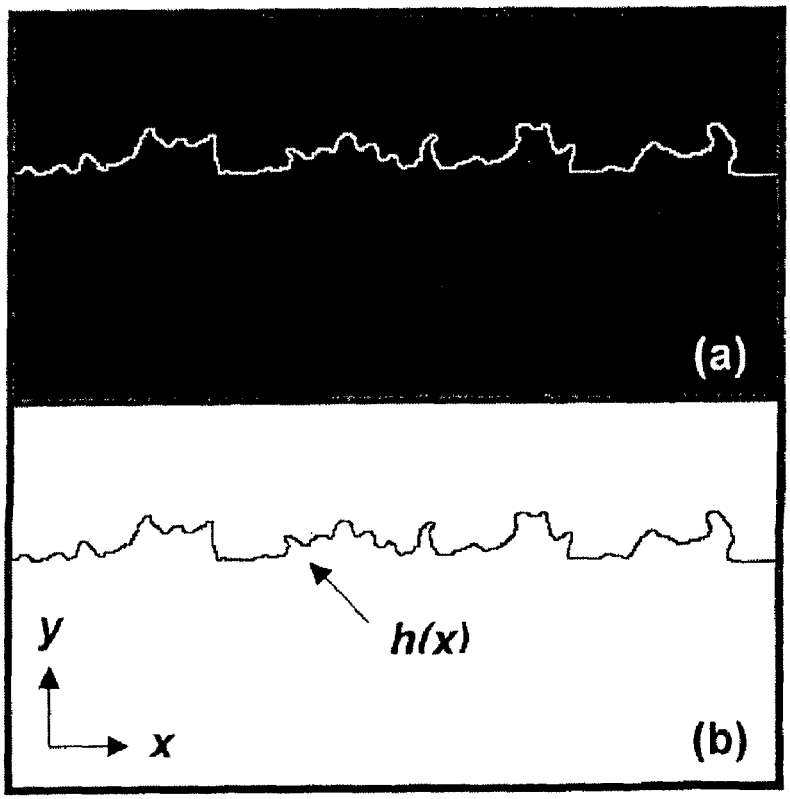
FIG. 13

FIG. 14
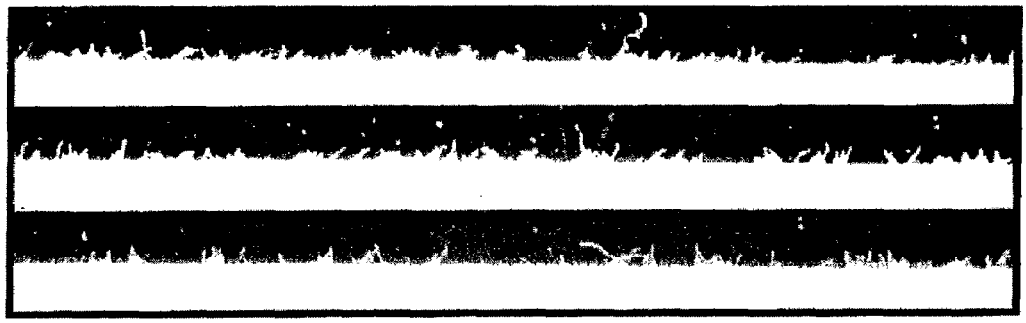
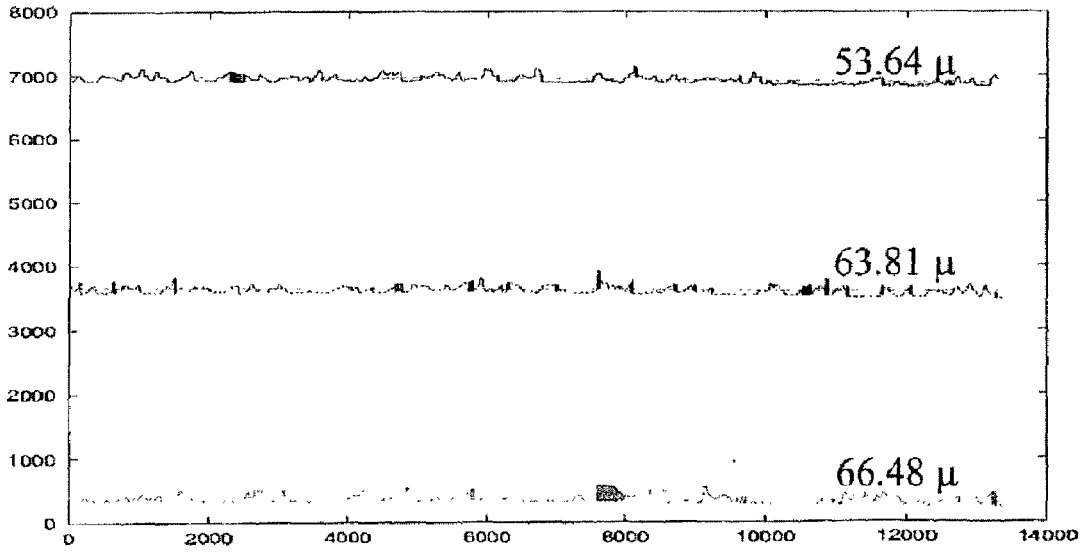
FIG. 15

CARD SHEET CONSTRUCTION

Matter enclosed in heavy brackets [ ] appears in the original patent but forms no part of this reissue specification; matter printed in italics indicates the additions made by reissue.

BACKGROUND OF THE INVENTION

The present invention relates to sheets of calling or business cards, photograph cards, post cards and the like, methods of making them and methods of using them.

The design of calling or business cards by simply printing them with commercially available laser or inkjet printers is of interest. Small size printable media, such as calling or business cards, cannot be individually printed with conventional laser or inkjet printers due to their small format. For this reason, for printing calling cards by means of a laser printer or an inkjet printer, card sheets are usually initially used, from which the calling cards are separated after having been printed, leaving a residual "matrix" of the card sheet. In these card sheets a supporting structure is provided for the cards and a wide variety of embodiments are known for such card sheets and carriers.

In a first class of card sheets, the matrix of the card sheet, or a portion of that matrix, itself acts as the carrier for the cards. Thus, there are calling card sheets in which the material is microperforated and the card is broken out along the microperforations to separate the cards from the matrix. The cards to be separated and having a microperforation are connected to the card sheet by material bridges. When the cards are separated from the card sheet, these bridges partially remain at the edges of the cards. These separation residues are unsightly and not desired especially for high-quality products, such as calling cards.

In one variation of this first class of card sheet product, instead of microperforations, the card sheet includes die cut lines penetrating much but not all of the card sheets ("substantially cut" lines), and cards are separated from the surrounding matrix by severing the uncut portions of the substantially cut lines. Another variation uses a multi-layer structure for the card sheet, wherein one of the layers acts as the carrier material. In these variations, the same problem mentioned above may occur, i.e., unsightly residual material after separation of cards. Patent publications illustrating this first class of card products include: U.S. Pat. No. 5,853,837 (Popat, commonly assigned herewith; substantially cut lines); see also U.S. Patent Application 2001/0036525 A1 (Yokokawa; multilayer card structure). (The entire contents of all patents and other publications mentioned anywhere in this disclosure are hereby incorporated herein by reference.)

In a second class of card product designs, the cards are completely cut from the surrounding matrix by cut punching, and one or more additional structures are used as a carrier for the cut cards. The structure of such cut-punched calling card sheets results from a printable top material and a carrier material applied to one side of the top material, the carrier material being bonded to the cards and to the matrix to support the cards within the matrix. One example of this second class of card products uses relatively narrow carrier strips or tapes, which are applied to the punched lines along the short side of the (A4) sheet, from which the printed card may be drawn off The adhesive remains on the self-sealing tapes when the card is drawn off. A disadvantage of this construction is that the top material/carrier connection is relatively unstable, which impairs the feeding and transportation behavior in the printer. In addition, there is the danger that tape fibers are torn-off by the action of removing the cards from the adhesive tape. This embodiment is shown in U.S. Pat. No. 5,702,789 (Fernandez-Kirchberger et al.).

Other versions of this second class of card sheet products use a "liner" sheet as the carrier, wherein the liner may be a full sheet corresponding to the top sheet, or may have sections removed from a full sheet. In so-called "dry-peel" constructions, the bond between the liner and the top sheet is created using an extruded polymer with a debondable interface to the top sheet or to the liner sheet. In removable or ultra-removable adhesive constructions, the bond is created using a removable adhesive between the top sheet and the liner sheet. When the cards are drawn off from the carrier, the adhesive remains on the reverse side of the card, which leads to a tangible and visible change as well as to a limited writeability of the reverse side of the card, which is judged to be of inferior quality.

Alternatively, a method is known in which a calling card sheet, which initially was coated on the reverse side with a silicon layer, is fastened onto a carrier material with an adhesive. The calling card sheet is cut-punched and, after having been printed, the individual calling cards can be drawn-off from the carrier material. Due to the silicon layer, the adhesive remaining on the reverse side of the calling card can be avoided. These calling cards, however, have an altered smooth reverse side, which is undesirable. In addition, such a reverse side has the disadvantage that its writeability is inferior. A further disadvantage is that the card is easily bent when it is drawn off from the adhesive carrier. Examples of this second class of card sheet products and dry peel laminates are shown in U.S. Pat. No. 4,863,772 (Cross, commonly assigned herewith), and PCT Publication Nos. WO 00/16978 and WO 00/46316 (both of Avery Dennison Corporation).

SUMMARY OF THE INVENTION

Pursuant to a preferred embodiment, the present invention is directed to card sheets, from which cards can be separated by simply breaking them out from the sheet, with the cards having smooth edges. The front and the reverse sides of the card sheet preferably feel the same to the touch. More particularly, the card sheet comprises a top material having punched or die cut lines, the front of which is printable and on the reverse of which a carrier material of at least one polymer layer is directly applied. The polymer can comprise a stress-at-break in the range of ten to thirty MPa and an elongation at break in the range of one to 300% (or ten to 300% or ten to 120%).

The (polymer) layer extruded on the top material cardstock can be poly-4-methyl-1-pentene (polymethyl pentene or TPX). However, higher melt flow polypropylene (PP) resins may provide better bonding. Examples of alternative polymers are thirty-five melt flow index (MFI) nucleated PP (Basell PD702N) and the same material with no nucleator (Basell PD702). These two materials can be compounded with a filler. A further alternative is thirty-four MFI, extrusion coating grade PP resin (Basell PDC-1292). Usable extruded polymers are: polypropylene; nucleated polypropylene; polypropylene followed by subsequent heat aging (120° F.-200° F. for two days); filled polypropylene (filled with thirty parts per hundred of three micron calcium carbonate); and polymethylmethacrylate (acrylic).

One alternative way of applying the carrier material to the top material is to apply a pre-polymer to the back side top material and then cure it with UV light to form the film. Subsequently, the top material is die cut to outline the card perimeters. Although die cutting is the preferred way to form the weakened perimeter lines, other less preferable techniques such as microperfing can be used.

Instead of having a paper top layer on top of one or more film layers, the card sheet construction can be a polymeric film construction. The surface(s) of the construction which define the printable card surface(s) should be printable. This can be done by using a film itself which is printable or by applying a printable coating. For example, the film can be formed from a melt processable blend of a water-soluble polymer and a substantially water-insoluble polymer to provide an inherently print receptive surface without further surface treatment as described in WO 01/76885.

The film-only construction can comprise a photosheet with die cuts on one side (or through both sides) to form the perimeters of the photo cards. The die cuts can penetrate between fifty and 98% of the thickness of the photosheet construction.

A preferred embodiment directly applies, as by extrusion, the (polymer) carrier material on the top material (cardsheet). This has a number of advantages over using adhesive to secure the two layers together. Adhesive makes the construction less stiff, and high stiffness is a highly desirable feature for business cards. The adhesive coating is visible on the backside of the card in areas where the adhesive does not wet out very well and there is imperfect contact between the two non-adhesive layers having different shades. This visibility can make, the business cards, which are high quality products, unacceptable.

The thickness of the carrier of the present invention and its unique mechanical properties allow for die cutting only on the top. Advantageously, this allows for a clean snap-break with only a single folding action. In other words, the user advantageously does not have to fold it back and forth to break it. "Snap break" herein means that the carrier yields during bending to a point, less than fully folded, where the carrier suddenly breaks. The single folding action, for example, can be forward between forty-five and one hundred and sixty-five degrees.

One embodiment of the invention is TPX that is extruded, treated on both sides with a printable topcoat (a primer might be needed), die cut partially through, then sheeted. Depending on the grade of polymer, one would choose material that has low elongation at break and high tensile strength, but not so high in tensile strength that it breaks when partially diecut. The stiffness must also be correct (somewhat adjustable by caliper) so that it has desired properties. The breaking apart of the cards may occur in either folding direction depending on the sheet construction. The choice of material can be such that folding toward the face would create sufficient leverage along the cut that the door analogy described later in the disclosure would be applicable. A less preferable alternative might need to be folded away from the die cut to "weaken" the "hinge", which then breaks when subsequently folded toward the face.

Other possible resin materials include some of the PE's, such as HDPE, PP, PET (there are several varieties of PET) and polystyrene. The resins might also contain various fillers such as clay, $TiO_2$ and/or nucleating agents to further modify the mechanical properties. The caliper of the sheet construction depends on the desired application, but for "cards", anywhere from about seven to twelve or fifteen mils might be reasonable.

Other inventions herein are a method for analysis of optical roughness of a fracture interface and objects or articles having at least one edge whose roughness is defined by that method.

Other advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 12 is an eroded image;

FIG. 13 shows a final fracture interface image extraction;

FIG. 14 are captured images of a fracture interface; and

FIG. 15 shows an interface contour extracted for a product of the invention.

DETAILED DESCRIPTION OF PREFERRED EMBODIMENTS OF THE INVENTION

Figure 1:
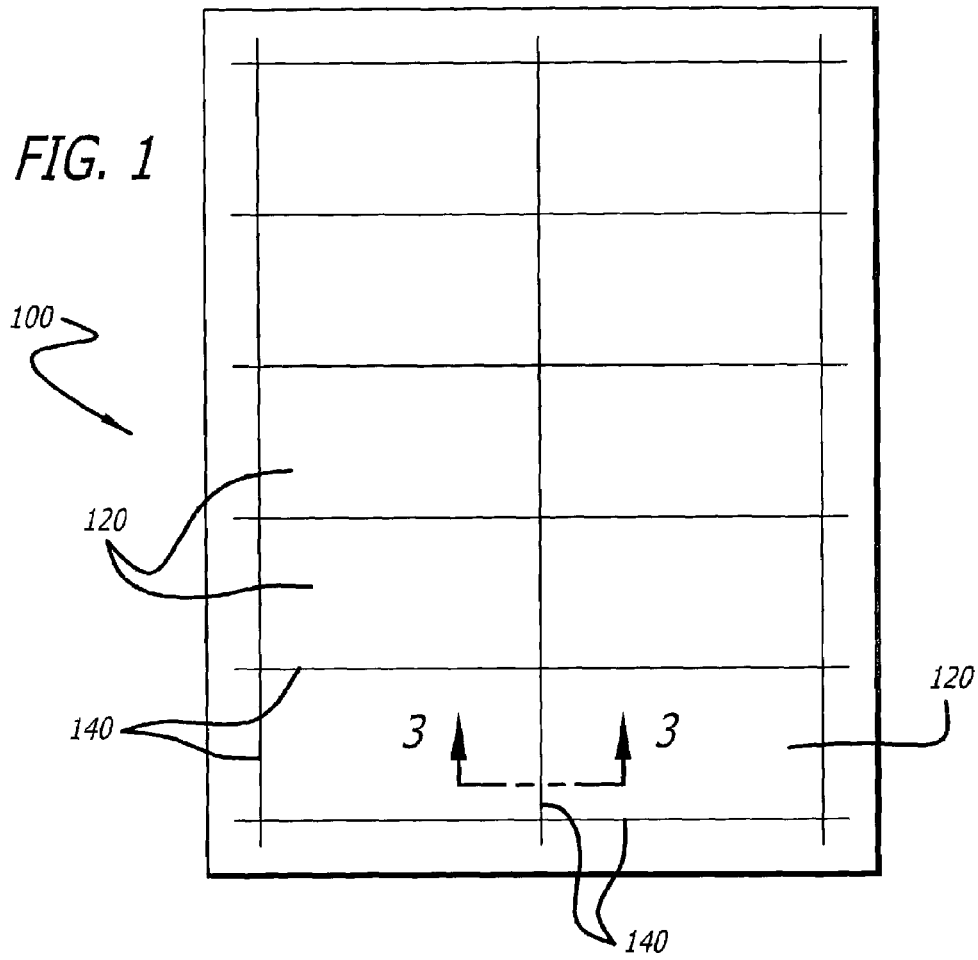
FIG. 1 is a top plan view of a card sheet of the present invention.
Figure 2:
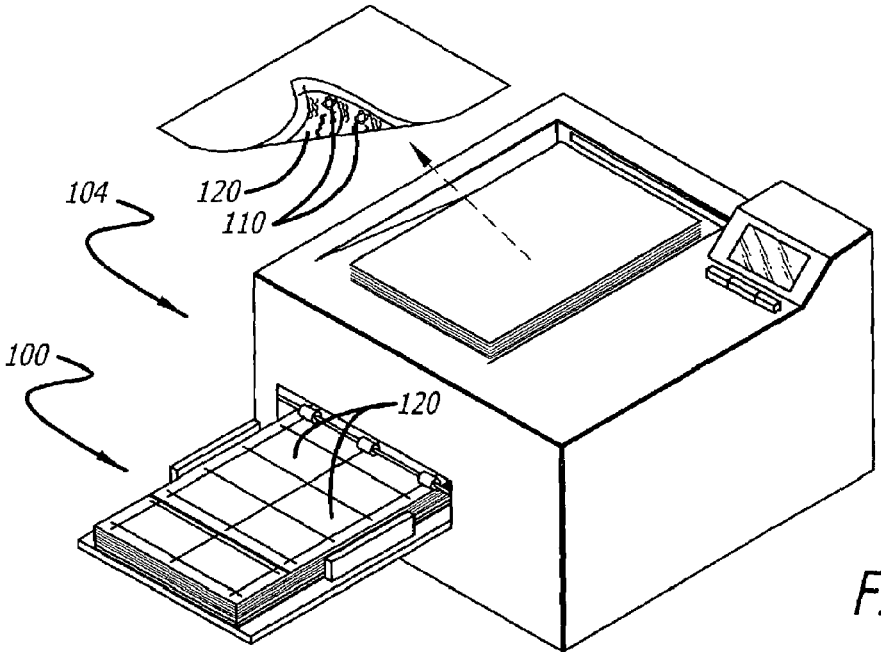
FIG. 2 is a perspective view of a printer (or copier) showing a stack of card sheets of FIG. 1 being inserted therein and printed.

A card sheet of the present invention is shown generally at 100 in FIG. 1. A stack of the card sheets 100 can be placed in the input tray of a printer (or copier) shown generically at 104 in FIG. 2. The desired indicia 110 can be printed on the cards 120 of the card sheet by the printer (or copier) 104.

Figure 3:
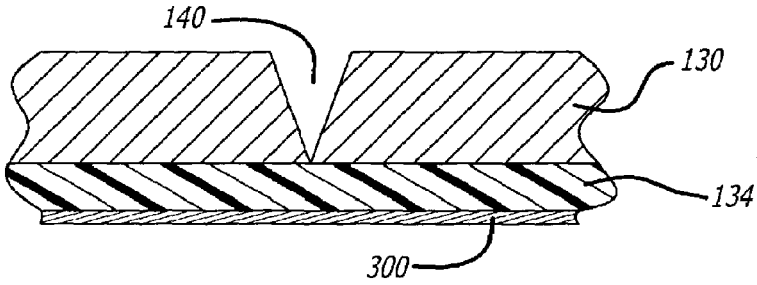
FIG. 3 is an enlarged cross-sectional view of the card sheet of FIG. 1 taken on line 3-3.

The card sheet 100 according to one embodiment of the invention comprises a top material 130 and a carrier material 134 directly applied to a bottom surface of the top material, as shown in the cross-sectional view of FIG. 3. Weakened separation lines 140 (such as die cut lines) through the top material 130 form the perimeters of the cards 120.

A "printable top material" means materials that can be printed with an inkjet printer and/or a laser printer 104 or other commercial printing methods such as offset printing, and/or by writing instruments. (Writing instruments can include pens, pencils or the like.) As top material 130, generally any card materials may be used which can be printed with an inkjet printer and/or a laser printer 104. Such card materials can, for example, also be coated or uncoated, dull or glossy, marmorated or obliquely transparent or they can have a linen or other topographic structure. When the cards 120 are to be calling or business cards, a card material having a grammage of one hundred and sixty to two hundred and fifty $g/m^2$ is preferred. Examples of preferred card materials include matte coated paper available from Felix Schoeller Specialty Papers (Osnabrück, Germany) and photoreceptive papers from Kanzaki Specialty Papers (Springfield Mass.); as well as laser papers available from Kohler (Germany), Neusiedler Group (Austria), and Monadnock Paper Mills (New Hampshire). The papers, when used in conjunction with the carrier, have a caliper suitable for the desired use, such as business cards or photo cards.

In order to separate individual cards 120 from the card sheet 100, the top material 130 preferably has punched or die cut lines 140. On the other hand, the polymer layer 134 is preferably not punched, though punching or die cutting (140) which dents but does not pierce or which penetrates only a slight distance can be used for certain applications. To provide a carrier material for cards punched within the card sheet 100, the polymer layer 134 preferably is applied directly onto the reverse side of the top material 120 such as by extrusion. If the top material 130 has a grammage of one hundred and sixty to two hundred and fifty g/m$^2$, the polymer layer 134 applied thereto preferably has a grammage of fifteen to forty-five g/m$^2$.

The separation of individual cards 120 from the card sheet 100 of the invention is carried out by bending along the punched lines 140 in the direction to the top material, whereby the polymer layer 134 snap-breaks cleanly along the punched lines. For this purpose, the elongation at break of the polymer layer 134 should be exceeded; that is, the elastic and plastic deformation of the polymer layer 134 should be as small as possible. In addition, the polymer layer must have a small resistance to further tearing. In other words, it should be brittle, so that when one side of the polymer layer is subjected to tension exceeding its elongation at break, the break will continue to the side that is not bent. It is thus a preferred feature of the invention that the polymer of which the polymer layer 134 applied to the reverse side of the top material 130 consists, has a stress-at-break in the range of ten to thirty MPa, preferably sixteen MPa, and an elongation at break in the range of ten to 120%, preferably twenty to 50%. The data on stress-at-break and elongation at break refer to EN-ISO 527-3/2/500. The data on the bending stress refer to EN-ISO 178.

The elongation at break of the polymer layer 134 further depends on the thickness of the top material 130. The thicker the top material 130 the greater the elongation of the polymer layer 134 is and the sooner the stress-at-break of the polymer layer 134 is attained. For this reason, the top material 130 preferably has a grammage greater than one hundred and fifty g/m$^2$, in particular in the range of one hundred and sixty to two hundred and fifty g/m$^2$.

The polymer of the carrier material 134 applied to the reverse or back side of the card sheet preferably has a bending stress in the range of 600 to 1200 MPa, and a bending stress of 600 to 900 MPa is preferred. In a preferred embodiment, the polymer has an elongation at maximum tensile strength from two to ten percent.

Figure 4:
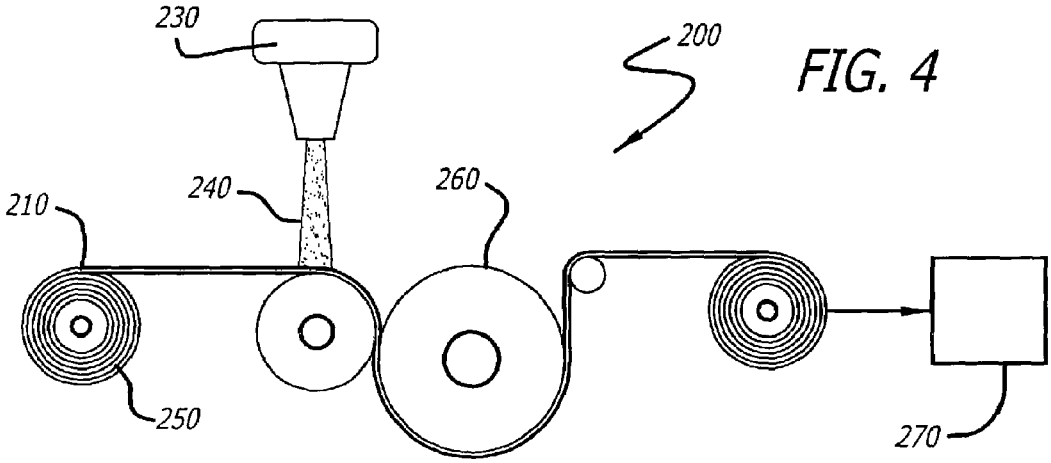
FIG. 4 is a schematic showing a process for manufacturing the card sheet of FIG. 1.

A simplified schematic view of a manufacturing process for a preferred card sheet 100 is illustrated in FIG. 4 generally at 200. Referring thereto, the cardstock material 210 is combined with the polymer backing material without using adhesives, rather the polymer (e.g., TPX) is extruded directly onto the cardstock material. FIG. 4 shows an extrusion die 230 extruding the hot molten polymer 240 on the cardstock material coming off of a roll 250. The coated material is cooled down rapidly by a chill roll 260. The material is then delivered on-line to the converting equipment 270, where it is die cut, sheeted, and packaged. Alternatively, the coated material can be rolled into roll form and converted off-line at a later time or in another facility.

Generally, any polymer is suitable for the polymer layer 134 as long as it has the mechanical properties indicated herein. Preferred polymers include polymethylpentene, polyolefins (such as polypropylene, polyethylenes and copolymers of propylene and ethylene), polyesters, polymethyl methacrylate, polystyrene and compatible mixtures thereof.

In a preferred embodiment (FIG. 3), the surface 300 of the polymer layer is roughened. It may be obtained thereby that the front side of the top material 130 and the polymer layer 134 applied to the reverse side of the top material have similar haptic properties, that is, the front and the reverse sides of the resulting card 120, such as a calling or business card, feel similar to the touch. Good writeability and a good feeding and transportation behavior in the printer are also obtained by the roughening.

The surface roughness of the reverse side of the polymer layer 134 is determined by the chill roll 260 after extrusion. (The chill roll 260 is the roll that cools the melted polymer, as explained above.) By suitable selection of the chill roll 260, the surface roughness may be adjusted such that the reverse side of the polymer layer 134 may be printed with a laser printer (or writing instrument). A selection of the roughness such that the polymer layer 134 may be printed by a laser printer (or writing instrument) represents a further preferred embodiment of the invention.

In other words, the roughness of the polymer layer 134 is mainly provided by the structure of the chill roll 260 after extrusion—the rougher the chill roll, the rougher the polymer layer. Another method of obtaining a surface roughness is to apply a coating 300 to the backside of the sheet construction, that is, to the polymer layer 134.

The polymer layer 134 of the card sheet 100 according to the invention is preferably directly applied to the reverse side of the top material by extrusion, as mentioned above. This allows the polymer layer 134 to stick to the top material 130 so that no contact adhesive layer therebetween is required to connect the top material to the polymer layer.

Figure 5:
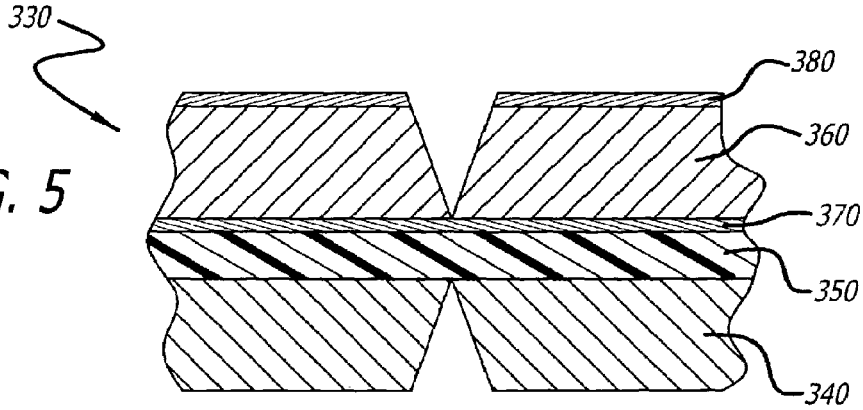
FIG. 5 is a view similar to FIG. 3 showing a first alternative card sheet of the invention.

In a further embodiment of the invention as shown generally at 330 in FIG. 5, a second top material 340 may be additionally applied onto the polymer layer 350, so that the polymer layer is positioned between two layers of a first top material 360 and a second top material. In order to produce such a card sheet, the second top material 360 is also fed from the polymer side when the polymer sheet is extruded onto the first top material. Also in this embodiment, the first and the second top materials stick directly to the polymer layer 350. Both top materials are preferably provided with punched lines, by means of which the cards may be broken out from the card sheet 330 by bending them in any direction. On the other hand, the polymer layer 350 is preferably not punched. This allows the front side as well as the reverse side of the card sheet 330 to be printed. Both top materials are as defined above and may be the same or different from each other. Additionally, the second top layer may not be extruded, but may consist of another web of top material. In this manner, the two top materials may both be paper being held together by TPX. The two papers in this example do not have to be the same.

When the carrier material comprises two layers, the bottom layer 350 can be TPX, the top layer 360 can be white-filled polyolefin and an optional tie-layer 370 can be provided. Examples of preferred tie-layer materials include anhydride modified polymers such as anhydride modified polypropylene, anhydride modified polyethylene, anhydride modified ethylene vinyl acetate, anhydride modified ethyl methyl acrylate, anhydride modified ethyl acrylic acid, and copolymers and mixtures thereof. The polyolefin can have a suitable topcoat 380. The thickness of the TPX is chosen to be thin as it tends to be the more costly component; preferably one to two mil is needed to obtain the snap-break feature of this invention. The thickness of the top layer 360 depends on the application, which for business cards would be in the range of eight to ten mils.

Figure 6:
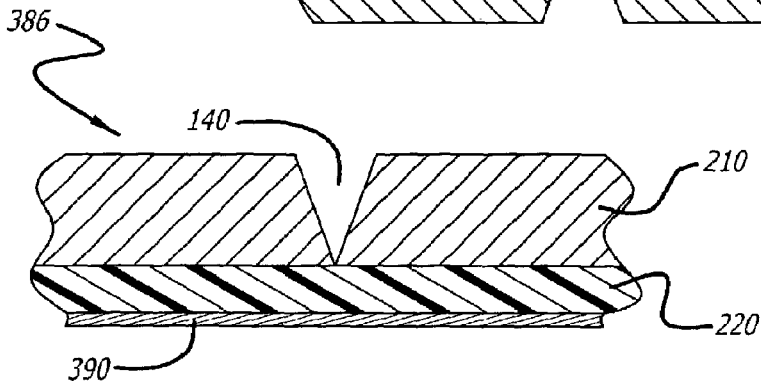
FIG. 6 shows a second alternative.

In a further embodiment as depicted at 386 in FIG. 6, the polymer layer opposite to the top material is coated with a common inkjet coating 390 for films, which allows printing with an inkjet printer. Such inkjet coatings are known to persons skilled in the art. In most cases, they consist of one or more latex binders (e.g., vinyl acetate, ethylene vinyl acetate), one or more fixing agents (e.g., polyamine) and silica.

The cards 120 broken out of the card sheets 100, etc. according to the invention may be constructed and used as calling (business) cards, photograph cards, post cards or the like as would be apparent to those skilled in the art from this disclosure. Preferred length and width dimensions are 2×3.5 inches for business cards and 4×6, 5×7, 2×3 and 8×10 for photocards. The card sheet itself can, for example, be 8½×11 inches, 8½×14 inches or A4 size.

The top material 130 can have a thickness of 150 μm to 250 μm. While the lower limit is important for the breaking behavior (for very brittle polymers, thinner and less stiff materials are acceptable), the upper limit is important for the desired total thickness of the product.

Workable thickness ranges for the carrier material 134 are twenty to fifty g/m$^2$ or twenty-five to sixty microns. The lower limit is important for converting. Regarding the higher limit: thicker polymers can work when semi die cutting the polymer; thicker polymers can be used when applied by lamination instead of extrusion; and for a single film construction (such as polycarbonate) which is semi-punched.

Figure 7A:
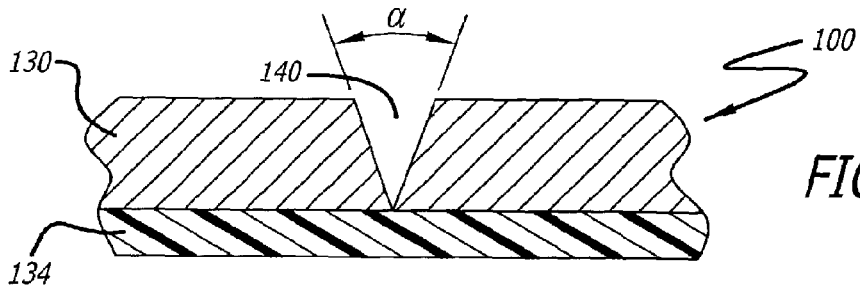
FIGS. 7a-7c show the snap-break mechanism steps of a card sheet of the invention.
Figure 7B:
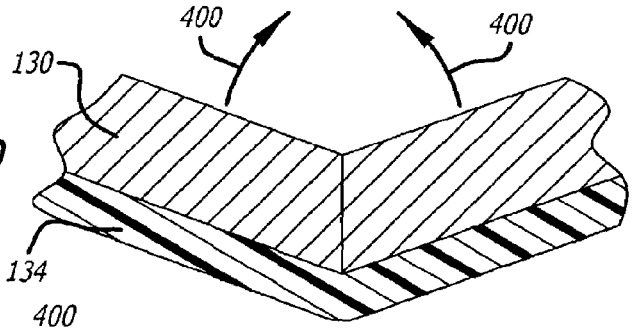
Figure 7C:
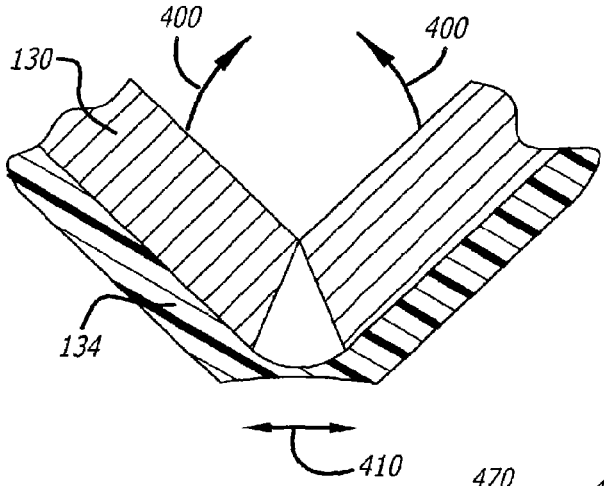

The mechanism for breaking a card sheet of the present invention is illustrated in FIGS. 7a, 7b, and 7c. FIG. 7a shows a cross-section of a portion of a card sheet 100 of the present invention, preferably after the sheet has been passed through a printer (or copier) 104 and the desired indicia printed on the top surface of the top material 130, which can be paper or cardstock. A V-shaped die cut 140 is illustrated through the top material and to the top surface of the (polymeric) carrier material 134. The die cut 140 is illustrated to have an angle α wherein α is preferably between fifty and eighty degrees, with sixty degrees being preferred. To separate the individual cards from the rest of the sheet, the sheet is folded upwards or towards the top material 130 and about the die cut line 140 wherein the folding action is depicted in FIG. 7b by arrows 400. The bottom layer 134, as can be understood from FIG. 7c, elongates (as depicted by arrow 410) and eventually breaks along a clean straight line directly beneath (adjacent) the die cut line. In other words, with (preferably) only a single fold it snap breaks cleanly.

The present card sheet construction 100 and the above-described breaking mechanism can be likened to a hinged door assembly where the hinge is the film 134 and the facestock 130 (which has been cut through to the film) acts like the door and the door jamb. Thus, when the "door" is closed, it is overdosed through the "door jamb." There is a leverage point on the die cut portion and as the door is forced closed the film 134 stretches and breaks because of the leverage force. In other words, because the facestock 130 is fairly thick, when the "door" is closed the film 134 stretches along its back surface and snap-breaks cleanly. Thus, low elongation of the film is desirable so that it breaks after stretching only a small amount (and thus the "door" does not fold or open fully). On the other hand, the tensile strength of the film has to be high enough to hold the sheet together so that the cards do not fall off due to handling stresses including the stresses exerted on it as it is passed through a printer.

Another polymer which provides this single fold, clean snap-break is polyethylene (PE). PE has a tensile strength of eight to thirty-four MPa, and a minimum elongation at break of ten percent and a range of ten to 300%. These strength and elongation values define an alternative definition(s) of the present invention.

The ease of breaking towards the paper face 130 is proportional to $1/\alpha$, $1/\text{mod}_{film}$, $\text{mod}_{paper}$, $\text{thickness}_{paper}$, $1/\text{thickness}_{film}$, and $\text{density}_{papers}$. That is, it is easier to break if the angle of the cut 140 is narrower (sharper), the modulus (strength or hardness) of the film is lower, the modulus of the paper is higher, the paper is thicker or more dense, or the thickness of the film is lower. These all assume the die cut is only as far as the film layer. If the die cut is deeper or shallower, then the depth of the die cut should replace the thickness of the paper.

The ease of breaking towards the polymer 134 (in the opposite folding direction) will be similar to the above "rules" except that none of the attributes of the paper 130 should play a role (assuming the paper is completely cut through) and the angle or sharpness of the die cut will also not play a role. In addition, because there is no lever point, it is possible that the film 134 will only bend and weaken but not break. If this is the case, multiple bendings will be needed to cause separation.

In order for the film layer to break, the strain (elongation) must be above the elongation at break of the film layer; in the worst case, when there is a one hundred and eighty degree bend to break, the elongation is going to be approximately: elongation parameter=2*(t1+t2)/d wherein t1 is the thickness of the paper layer, t2 is the thickness of the extrusion coated layer, and d is the width of the die cut and used as the initial film length before stretch.

The invention is explained in detail by the following examples.

EXAMPLE 1

Polymethyl pentene (TPX) with a coating weight of twenty g/m$^2$ is extruded onto the reverse side of an A4 sheet consisting of 185 g/m$^2$ ivory board, which is suited to be printed with a laser printer and an inkjet printer. The sheet is punched on the front side in two rows of five calling or business cards each. The card is broken out by bending it towards the top material. The mechanical properties of the polymer polymethyl pentene used are listed in the Table below.

EXAMPLE 2

TPX with a coating weight of twenty g/m$^2$ is extruded onto the reverse side of an A4 sheet consisting of 200 g/m$^2$ glossy castcoated paper for inkjet photo prints. The reverse side of the sheet (the side onto which the polymer is extruded) is as smooth as the front side. The sheet is punched on the front side. The card is broken out by bending it towards the top material. The mechanical properties of the polymer polymethyl pentene used are listed in the Table.

EXAMPLE 3

TPX with a coating weight of twenty g/m$^2$ is extruded onto the reverse side of an A4 sheet consisting of 185 g/m$^2$ ivory board, which is suitable for laser and inkjet printers. The sheet is punched on the front side in two rows of five calling or business cards each. A further coating of the film with an inkjet coating on the reverse side of the card material allows printing also on the reverse side, so that a calling card may be individually produced that may be printed on both sides. The card is broken out by bending it towards the top material. The mechanical properties of the polymer polymethyl pentene used are listed in the Table.

EXAMPLE 4

A4 sheets consisting of a top material having a weight of ninety to 125 g/m$^2$, 30 g/m$^2$ extruded TPX and a top material having a weight of ninety to 125 g/m$^2$, punched on the front and reverse sides with the same punching tools at the same location have been produced, with the printing being possible on the front side and the reverse side and the cards being broken out by breaking them in any direction. The mechanical properties of the polymer polymethyl pentene used are listed in the Table.

COMPARATIVE EXAMPLE 1

The same sheet as in Example 1 above differing in that polypropylene has been used as the polymer of the polymer layer. The mechanical properties of the polymer polypropylene used are listed in the Table.

COMPARATIVE EXAMPLE 2

The same sheet as in Example 1 differing in that as the polymer of the polymer layer polyester (filler-free polyethylene terephthalate) has been used. The mechanical properties of the polyester used are listed in the Table.

TABLE

| MECHANICAL PROPERTY OF THE POLYMER | EXAMPLES 1-4 | COMPARATIVE EXAMPLE 1 | COMPARATIVE EXAMPLE 2 |
|---|---|---|---|
| Bending stress 23° [10 MPa] | 90 | 145 | 270 |
| Stress-at-break [MPa] | 16 | 36 | 60 |
| Elongation at break [%] | 50 | 350 | 160 |
| Breaking of card sheet into separate cards possible? | Yes | No | No |

Film-Only Embodiments

Figure 8:
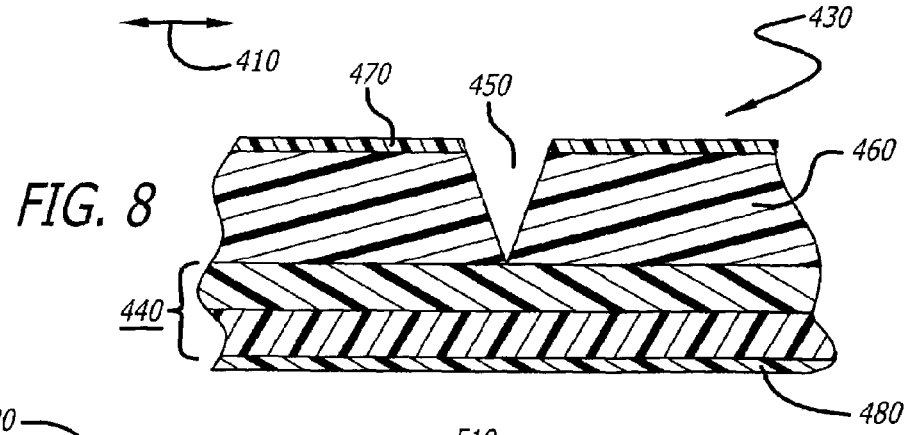
FIG. 8 shows a third alternative.

The construction as shown at 430 in FIG. 8 consists of film only; that is, no paper laminate is used. This construction may be multi-layer or single layer. It can be produced by conventional film-forming means known in the industry and may include extrusion or coextrusion. The extrusion means may be cast or blown. The thickness of the construction is dictated by the application and may range from two mils to fifteen mils. This range is illustrative only though and may be wider if needed for performance attributes and/or consumer expectations.

In a single layer construction, the choice of materials falls within the range of physical or mechanical performance characteristics previously outlined. Chemical and physical characteristics are chosen for properties such as elongation at break and tensile strength. The layer may consist of a single polymer, or a polymer blend or alloy, that results in the desired characteristics. Additives such as fillers or nucleating agents (as discussed in detail later) may be used to modify the properties in order to achieve the desired performance.

In multiple layer constructions, the same set of criteria should be met; however, only the set of layers 440 that is contiguous, i.e., not die cut (450), needs to have the desired physical performance requirements. The non-contiguous layer 460 may have the desired characteristics, but it is not necessary that it have them. Each of the multiple layers can consist of a single polymer, or a polymer blend or alloy. Fillers, nucleating agents and other additives may also be used in any or all of the layers.

The surface(s) of the film-only construction may be further modified to accept printing. This modification can consist of in-process treatments, such as corona treatment, or the addition of a layer 470 designed to accept printing. Examples include any of a variety of topcoats well known in the art. And an example of a preferred topcoat is disclosed in U.S. Pat. No. 5,750,200 (Ogawa, et al.), and comprises a pigment and a synthetic polymer latex as the binder to provide a glossy surface. Topcoats 470 can be applied by any conventional means such as die coating, spray coating, etc. The coating should accept the specific printing means being targeted and have sufficient adhesion to the film to avoid being easily removed during product use. The coating or modification can be applied to one or both surfaces (see bottom coating 480) of the construction 430 depending on the intended use. Typical weights of coats 470 and 480 range from two g/m$^2$ to fifty g/m$^2$, and more preferably in the range of ten g/m$^2$ to thirty g/m$^2$.

This construction includes die cutting 450 or some other means of controlling where the product breaks upon bending. The means of control is sufficient in depth (in the case of die cuts) or has another characteristic of control such that the construction cleanly and easily breaks upon bending, but not so easily as to break prematurely, for example in a printer (104) when being printed. Control of these properties can be accomplished through the depth of the die cut, width of the die cut, and so forth.

Preferred polymers include polymethylpentene, polyolefins (such as polypropylene, polyethylenes and copolymers of propylene and ethylene), polyesters, polymethyl methacrylate, polystyrene, and compatible mixtures thereof. In the case of multiple layers, the relative thicknesses would depend on costs of the materials and functionality. For example, one mil of polymethylpentene is sufficient to enable the snap-break mechanism (see FIGS. 7a-7c); however, if the ultimate product is a cardstock, additional materials may be needed to achieve the desired thickness. These might be chosen from polymers that are relatively inexpensive, such as commodity-grade polyethylene, but lack the ability to crack properly. Nine mils of polyethylene can be used to produce a ten mil construction. In this instance, a tie-layer might be needed to prevent the layers from separating and can be selected from materials well known for this purpose. Examples of preferred tie-layer materials include anhydride modified polymers such as anhydride modified polypropylene, anhydride modified polyethylene, anhydride modified ethylene vinyl acetate, anhydride modified ethyl methyl acrylate, anhydride modified ethyl acrylic acid, and copolymers and mixtures thereof. Since the polyethylene layer will likely not provide the snap-break mechanism, die cuts to the polymethylpentene layer may be required.

A preferred sheet construction of the present invention consistently snap breaks with a single forward bend of forty-five degrees to one hundred and sixty-five degrees. That is, back-and-forth or multiple forward bendings are not needed. This commercially valuable characteristic is not known in the prior art. Tests were conducted on the following sheets of the present invention: (1) matte ink jet coated, (2) glossy ink jet coated and (3) uncoated laser. Each of them broke sixty out of sixty times with a single forward fold. Accordingly, pursuant to one definition of the invention the sheet breaks with only a single forward fold toward the printable top material at least 95% of the time with 95% confidence, and according to another definition of the invention, the sheet breaks with only a single forward fold toward the printable top material at least 93% of the time with 99% confidence. Important in this "single fold" property is the matching of the top material (such as paper) with the polymer layer of the present invention. The paper is selected to allow the breaking mechanism to occur.

Polymer Process Embodiments

General concepts common to each of the "polymer process" alternatives are that the paper is used as one layer, polymer or film as the second. The thickness of the paper or film depends on final product requirements. The total construction thickness can range from two to fifteen mils. Relative thicknesses of the layers can range from mostly paper with film coating to mostly film with thin a layer of print-enabling material, such as paper or topcoating.

A. Melt Process

For the melt process a film-forming polymer, or polymer blend or alloy, is heated to a temperature above its flow point, conveyed while molten, to a means of contacting a web of paper, cooled and wound in a roll form. (See FIG. 4 and the corresponding discussions above.)

The polymer is chosen as above. Physical properties related to ease of breaking cleanly are used to select appropriate polymers. Adhesion to the chosen paper is also used as a criterion for selecting the polymer. A preferred example utilizes polymethylpentene (TPX) as the polymeric material. Other polymers that may also provide suitable properties include polyesters, polyolefins, polystyrenes, and polymethyl methacrylates.

The polymer(s) may be melted in a conventional melting apparatus including single screw extruders such as those manufactured by Davis-Standard, twin-screw extruders such as those manufactured by Leistritz, or heated pots or melters (Nordson as an example). The exact temperature will depend on the materials' temperature stability and viscosity. Typical extruder conditions will depend on the materials but might include temperature ranges of 250° F. to 650° F. The molten polymer(s) are conveyed to a die by means of the extruder, a gear pump or any other suitable means. The die causes a sheet of molten polymer(s) to be formed, and this sheet is then deposited onto a paper or other substrate. The die may be in contact, or nearly so, with the substrate as in typical slot coating operations. Alternatively, the die may be located a distance from the substrate as in typical extrusion coating operations. Additionally, a nip point may be employed to ensure good contact of the film and substrate.

The polymer(s) may be further modified as above using fillers, nucleating agents, etc. (as described elsewhere in this disclosure in greater detail) and still remain within the scope of the invention.

The paper chosen should provide additional properties that are required for the application. The paper may need to be die cut, textured, printed upon, erased and so forth. It may also need to be thick enough to provide the overall thickness required for the application. Treatment of the paper may be required for adhesion or print receptivity. Means of adhesion promotion may include a primer, adhesives or corona treatment. Means of improving ink receptivity may include topcoats (mentioned above) or additives to the paper.

In addition to printing on the paper side of the laminate, the film side might also be printed upon. The choice of film may allow this, or, the film side may be treated with a means of enhancing printability. As above, these may include corona treatment or topcoats.

As an example, an extruder with a 2½inch diameter screw was used to extrude a 35 MFI Basell PD-702 polypropylene homopolymer resin through a twelve inch die, with melt temperatures between 550° F. and 600° F. The melt was coated directly onto paper with paper thickness at 8.6 mil and the polypropylene layer thickness at one mil. The line speed for winding was at fifty ft/min.

B. Solution Process

The "solution process" concept involves dissolving a suitable material or blend of materials in an appropriate solvent, coating the solution onto the paper, then driving the solvent off. Conventional solvent coating means can be used. Generally, ovens operating at temperatures that depend on the choice of solvent are used in-line with the coating process in order to achieve a uniform, dry film. Fillers might also be useful.

An example of suitable coating materials are aqueous acrylic coatings produced by Rohm & Haas and sold under the trade name RHOPLEX, containing about 40% to 60% solids, applied by any means capable of metering the desired coat weight onto the desired substrate. The coating is subsequently dried at oven temperatures of about 150° C. to 160° C. to obtain 100% solids acrylic coating.

C. Pre-Polymer Process

The "pre-polymer process" uses pre-polymers, monomers and optionally (if needed) initiators and accelerators. A mixture of these are coated onto the paper substrate, such as by conventional means including slot die coating, knife coating or gravure, to a uniform thickness. The mixture may be heated to aid coating, but heating may not be needed if the viscosity of the mixture is low. The pre-polymer mixture is then subjected to curing conditions to form the final film. The final film should have sufficient physical properties to enable the snap-break mechanism. Die cutting, surface treatments, etc. would then be performed to form the final product.

Various materials can be used to produce films, including acrylates, methacrylates, and multifunctional acrylates and methacrylates. These materials may be available from Sartomer Corporation. A suitable blend of these materials can be fashioned such that the final cured polymer has the desired snap-break characteristics. The blend can be coated onto suitable paper, and can be cured in a number of ways.

Thin (generally one mil or less) films can be produced by the addition of a photoinitiator such as benzophenone; other photoinitiators known in the industry including those falling within classes of phenones, and azo or diazo compounds can be used. The amount of photoinitiator will impact the final properties, and can be determined experimentally. After coating, the pre-polymer is irradiated with UV light (high-pressure mercury lamps are generally used), whereupon polymerization occurs, resulting in the final film.

Either thermal or electron beam methods may be used instead of UV light. These methods in particular can be used for thicker films where UV light will not penetrate deep enough to effect cure throughout the film. In the case of thermal curing, a thermal initiator will be added instead of a photoinitiator. Thermal initiators generally will be organic peroxides or diazo compounds. DuPont makes a class of initiators sold under the trademark VAZO, which can be used. The choice of initiator depends on the difference between the temperature required for coating and the temperature required for curing. An initiator is chosen that does not cause polymerization to occur prematurely at coating temperatures. The amount of initiator will impact the final properties of the film and can to be determined experimentally. The temperature required for cure depends on the initiator chosen and the speed of the desired reaction, and can also be determined experimentally.

In the case of electron beam curing, no initiator is needed, since the electron beam will produce free radicals upon impingement with the pre-polymer. Doses of radiation required can range from ten to fifty kilograys (one to five megarads).

Another pre-polymer that may be useful would make use of organic epoxides. Suitable epoxy mixtures include organic epoxides, accelerating agents (such as nonyl phenol) and initiators. Many initiators for these systems exist and can include metallic esters (such as organic titanates), free-radical initiators and cationic initiators. Many of these systems, however, consist of two parts and need to be blended just prior to curing. Control of the cure rate can be done through careful choice of materials. Most epoxy materials are hard and brittle and may be suitable as a crack layer as long as they have enough flexibility to survive use in desktop printers. Flexibilized bisphenol A epoxy acrylates such as those produced by UCB Chemicals (Belgium) and sold under the trademark EBECRYL are preferred flexible epoxy materials.

Post-Processing Embodiments

Any of the previously mentioned constructions may be used for this example. Thicknesses of the relative layers can be adjusted to the desired physical responses being sought in terms of overall thickness, cost of construction, printability, and so forth. The construction may be assembled by any of the means discussed.

A. Heat Treatment (Aging)

In general, a sample is heat aged at elevated temperatures to encourage crystallization within the polymer layer. More crystallization will likely improve the snap-cracking effect since polymeric crystals are more brittle than amorphous polymers. The temperature used should be above the $T_g$ of the polymer, but below the melt or flow temperature. This will allow rearrangement of the polymer molecules into lower energy states (crystallized). The treatment may be conducted while the product is unconverted, in roll form or after converting and/or packaging.

"A polymer solid is partially crystalline, such as polyethylene and poly(ethyleneterephthalate), or non crystalline, such as commercial poly(methylmethacrylate) and polystyrene. Partially crystalline polymers, called crystalline polymers, are constructed by a complicated aggregation of crystalline and amorphous regions. In the amorphous region the molecular chains are in a conformationally random state. In the crystalline region, polymer chains are extended in a definite characteristic structure and packed together regularly, forming a crystallite. . . . Crystallization of polymers with low crystallinity is accelerated by heat treatment under suitable conditions. The weight fraction of the crystalline regions determines the degree of crystallinity." Encyclopedia of Polymer Science and Technology—Supplement Volume pp. 187. "Crystalline polymers are not fully ordered, but are partially crystalline (semi-crystalline), typically less then about 80%. . . . Techniques employed to access relative and absolute degrees of crystallinity . . . five widely used methods . . . X-ray Diffraction, Volumetric, Thermal, Infra-red and Raman spectroscopy, and NMR." Vol. 4, pp. 482.

As an example, polypropylene may be used as the snap layer. The $T_g$ of polypropylene is close to 0° C. and its melting temperature is 162° C. The construction consisting of about one mil of polypropylene extrusion coated onto cardstock (8.6 mils) was heat aged for two days at 200° F. Possible semi-crystalline polymers subject to this treatment include semi-crystalline polymers such as polypropylene, HDPE, LLDPE, PET, and PETG.

As another example with polypropylene used as the snap layer, the construction consisted of about one mil of polypropylene extrusion coated onto cardstock (8.6 mils) was heat aged for seventy-two hours at 75° F. to 120° F. and 50% relative humidity. Possible semi-crystalline polymers subject to this treatment include polypropylene, HDPE, LLDPE, PET, PETG and polystyrene.

The length of time under the condition may vary, but will be a tradeoff between the cost of warehousing in heated buildings and the rate of crystallization. However, it is common practice in the industry to store films such as PET and PP (cast or oriented) under ambient conditions, such as in a warehouse for seventy-two hours, before making them available for further converting of end-use application.

B. Actinic Radiation

In general, the roll form of the product is treated with ionizing radiation either inline with assembly of the construction or in a separate step.

It is known that polymeric materials subjected to radiation energy can generate free-radicals and under an oxygen environment can subsequently oxidize the polymer. The effect may continue over weeks or months as the free radicals generated in the system continue to migrate and react. Materials such as polytetrafluoroethylene and polypropylene can easily lose 50% of their original elongation at break property when they were irradiated at or below one hundred kilograys (kGys). Such a loss of elongation properties can make the coated material easier to break off.

In the case of high-energy radiation (electron beam, gamma, x-ray, etc.) either side of the construction may be irradiated, since the radiation has sufficient energy to penetrate the entire thickness. However, the preferred side of irradiation is the film side, since the radiant energy diminishes with depth. Preferred doses for electron beam radiation range from ten to two hundred kilograys (one to twenty megarads) at very high dose rates (greater than ten kilograys per hour). Lower radiation doses (under ten kilograys for polypropylene) can be used if they are processed at slower dose rates such as five to fifty grays per hour.

Alternative preferred doses for electron beam range from ten to fifty kilograys (one to five megarads). There may also be a so-called dose-rate effect. The dose-rate effect is the difference in properties that occurs when a given dose is delivered over a varying amount of time. For example, two samples may both receive thirty kilograys of radiation, but one receives it while running at one hundred fpm while the other runs at five hundred fpm. If the properties of interest differ between these two samples, then there is a dose-rate effect.

As an example of this alternative, a roll of paper/polypropylene construction was made by extrusion coating of one mil layer thickness of polypropylene on to 8.6 mil paper. The finished roll was sent for electron beam irradiation at one hundred kilograys (kGy) to reduce its elongation at break by more than 50%, at a dose rate of more than ten kGy/hour. It is expected to yield a coated paper which is easy to die cut and break along the edges.

Converting Embodiments

A primary idea behind the "converting" embodiment is to show that the snappable film can be scored or partially cut to enhance the feature. It should be clear from the film-only embodiment that partially cutting through the film should work. As an alternative to cutting only to the film backing (as described earlier in this disclosure) the cutting can be somewhat deeper. For example cutting only one-quarter of the way through the backing layer above may be preferred. A suitable range may be between 0% (not cut) and 90%.

Other converting embodiments include the die being shaped differently. Examples are two-side sharpening resulting in a knife-like point and one-side sharpening resulting in a razor-like point.

The die geometry can affect the performance considerably. If the cut is V-shaped, some degree of bending is needed before the stretching process starts in the polymer. In addition, if the "V" is wide, the polymer may not be stretched enough to cause the fracture. A narrow cut in the paper can reduce the degree of bending required to generate the fracture in the polymeric layer. The extent of the cut into the polymer can have positive and negative effects. If the cut extends into the polymeric layer, it helps the polymer to fracture upon bending by reducing the thickness and introducing a fracture initiating point. However, it may deteriorate the mechanical properties of the product, especially when it is passing over the rollers and being printed.

The adhesion between the polymeric layer and the paper has to be strong enough in order to concentrate the stress on the fracture point. The structure and the rigidity of the paper substrate and its thickness are also important factors. If its compression strength is low, the paper is compressed at the cut as the result of bending instead of stretching the polymer.

Additives Embodiments

Various nucleating agents and pigments can be incorporated into the film formulations of the present invention. The amount of nucleating agent added should be an amount sufficient to provide the desired modification of the crystal structure while not having an adverse effect on the desired properties. It is generally desired to utilize a nucleating agent to modify the crystal structure and provide a large number of considerably smaller crystals or spherulites to improve the stiffness, and the die-cuttability of the film. Nucleating agents which have been used previously for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or arylalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium beta-naphtholate, lithium benzoate and aluminum tertiarybutyl benzoate also are useful organic nucleating agents. Substituted sorbitol derivatives such as bis (benzylidene) and bis (alkylbenzilidine) sorbitols wherein the alkyl groups contain from about four to about eighteen carbon atoms are useful nucleating agents. More particularly, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polypropylenes. Useful nucleating agents are commercially available from a number of-sources. Millad 3988 and Millad 3905 are sorbitol nucleating agents available from Milliken Chemical Co.

The amounts of nucleating agent incorporated into the film formulations of the present invention are generally quite small and range from about one hundred to about 2000 or 4000 ppm of the film-forming layer. Preferably the amount of nucleating agent should not exceed about 2000 ppm, and in one embodiment, a concentration of about three hundred to five hundred ppm appears optimum.

Similar nucleating agents can be used for other semi-crystalline polymers that crystallize slowly as well. Ranges of concentrations are listed in the paragraph above for the additives as well. The amount of material added will be a tradeoff between rapid crystallization and poor performance (too much additive is used) and slow crystallization and good performance (too little additive used).

Nucleating agents such as the dibenzylidene sorbitol-based Millad 3905 or Millad 3988 were used in polypropylene to reduce the spherule size and thus to improve the clarity of the polypropylene. Other sorbitol-based nucleating agents include IRGACLEAR sold by Ciba Specialty Chemicals and NC-4 from Mitsui Toatsu Chemicals in Japan. These nucleating agents are also called clarifiers. Other nucleating agents can be used including phosphate esters based NA-11 and NA-21 supplied by Asahi-Denka Kogyo of Japan, a norbornane carboxylic acid salt based HPN-68 by Milliken Chemical Company.

Basell PD-702 and PD-702N material can be used for extrusion coating on paper for comparison purposes. PD-702N is the nucleated version of the same PD-702 homopolymer PP resin, with 2000-2500 ppm quantity of sorbitol-based nucleating agent added in the material formulation. It is believed the nucleating agent will change the physical property of the polypropylene surface layer and reduce its elongation at break, such that the paper will be quick and easy to snap-break. Both polypropylene materials, at one mil thickness, can be extrusion coated on to 8.6 mil paper.

Significant reduction of material's elongation at break can be achieved by adding fillers into the material formulation. In this particular example fifteen pph of three micron Camel-WITE calcium carbonate (Genstar Stone Products Company) was compounded with Basell PD-702 polypropylene resin, and extrusion coated at one mil thickness on to the 8.6 mil paper.

The additives approach is suitable for any of the constructions listed, whether film-only or film/paper-based.

Additional Alternative Constructions

Any of these approaches may be combined with others. For example, a construction that has nucleating agents added can be heat treated. The effect may not be linearly additive, but may provide incremental improvements in properties.

As may be understood from the above discussions, the mechanical properties of the polymer layer are important to snap-break out individual cards (or sheet portions) with smooth cutting edges from the card sheets.

Figure 9:
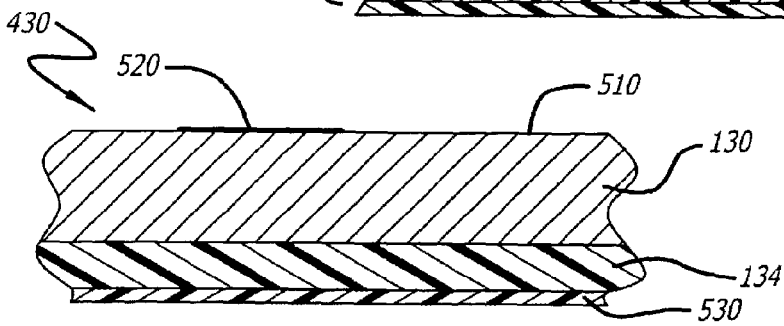
FIG. 9 shows a fourth alternative.

One preferred use or construction of generally any of the above card sheet embodiments is printed business cards. Another is photo cards 500 (FIG. 9) which would have a photoreceptive surface 510 for receiving a photo image or photoprinting 520. Examples of photoreceptive coated papers which can be used for the photo card sheets are those manufactured by Oji Paper Co., Ltd. (Tokyo, Japan), Mitsubishi Paper Mills Limited (Tokyo), Japan Pulp and Paper Company Limited (Tokyo), Zanders USA (Wayne, N.J.), and Sihl Paper Company (Switzerland). These are cast coated glossy papers, instant dry papers, photo quality papers and photorealistic papers. The coatings are swellable or microporous coatings.

A further alternative to all of the constructions disclosed in this disclosure is to apply a backcoating 530 to the polymer layer. The backcoating can be used to reduce static electricity, improve writability, and/or improve print quality in laser printers (because static electricity disturbs toner transfer). The backcoating can be a standard antistatic coating used by manufacturers of filmic products, modified for good anchorage to the polymer as would be apparent to those skilled in the art from this disclosure.

Additionally, while the printing is preferably inkjet or laser means, other methods include gravure, offset printing, and other press-type printing techniques. (Hand) writing is another method, and the rationale for it is that users may wish to quickly convey additional information informally, as needed, for example, personal telephone numbers on the backs of business cards. Printing press techniques can be used to standardize portions of the separable (sheet) members, while allowing personalization in other areas. A business card example of this technique is that a company has its logo printed on business card sheets. At a separate time, an employee can (hand)print his particular (individual) information on the card. Topcoats, corona treatment and other means by which the materials can be made inkjet and/or laser receptive can also be used to make the surface(s) receptive to other marking means (pen, pencil, etc.) as would be apparent to those skilled in the art from this disclosure.

Although preferred embodiments are for traditional cards, the present invention is not so limited. It can be a thin sheet, as thin as four mils. The absence of a central flexible adhesive layer allows for such thin gauges. Rather, it can include other embodiments/uses (for parts of sheets) such as inserts on hanging file folders, which tend to be as thin as paper and are perfed to be torn apart. The present invention can offer cleaner inserts. Other applications include CD jewel case inserts.

Method for Analysis of Optical Roughness of the Fracture Interface

1. Introduction

Generally, the above-described products are composite structures made of a polymeric layer coated on different types of high quality paper products such as business cards and photo quality papers. The product is easily fractured and separated by the customers after printing the desired information or photographs using inkjet or laser printers. One of the main advantage of the product over other existing perforated papers products is the smoothness of the interface after the fracture. The smoothness of the fracture interface can be described as a combination of the optical (visual) as well as mechanical (touch) smoothness.

A method of the present invention to quantify the optical smoothness in these products will now be described. This method is based on the optical microscopy of the fracture interface and further processing of the image and calculation. The interface roughness values can be used as one measure (among others) to compare the optical smoothness of the fractured products.

2. Sample Preparation and Image Capture

Samples are prepared by bending and fracturing the product towards the paper substrate. The fractured samples are handled carefully without touching the fracture interface. This ensures that the roughness will not change before capturing the image under the optical microscope.

Figure 10:
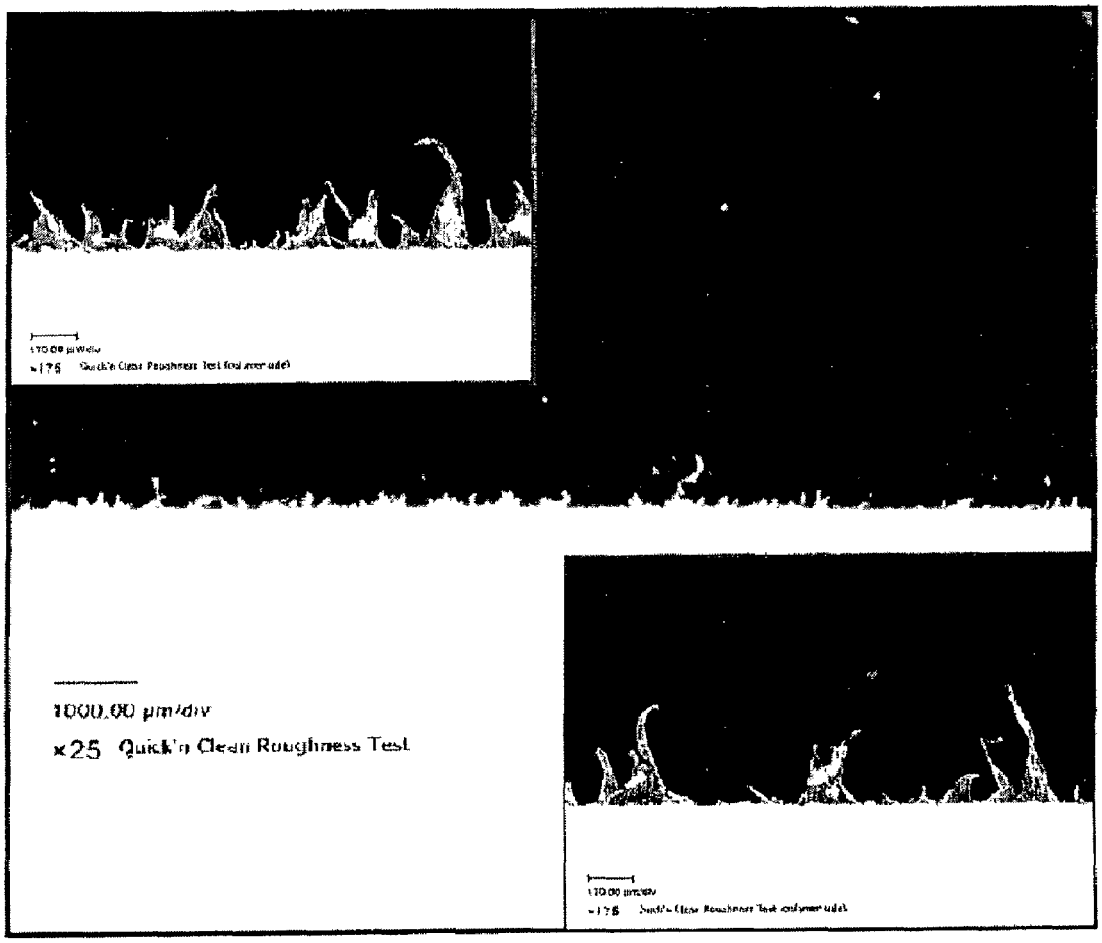
FIG. 10 is a digital view of a fracture interface of an embodiment of this invention.

The samples are placed over a dark background and the interface image is digitally captured using the Keyence optical microscope in reflection mode. FIG. 10 represents the digital image of a sample prepared using this method. It is a digital image of the fracture interface (×25) in a product. The insets in that figure show the higher magnification (×175) images of the interface. For a given sample, several digital images are captured from different locations on the product in order to collect enough data for further processing and calculations.

3. Image Processing and Calculations

Figure 11:
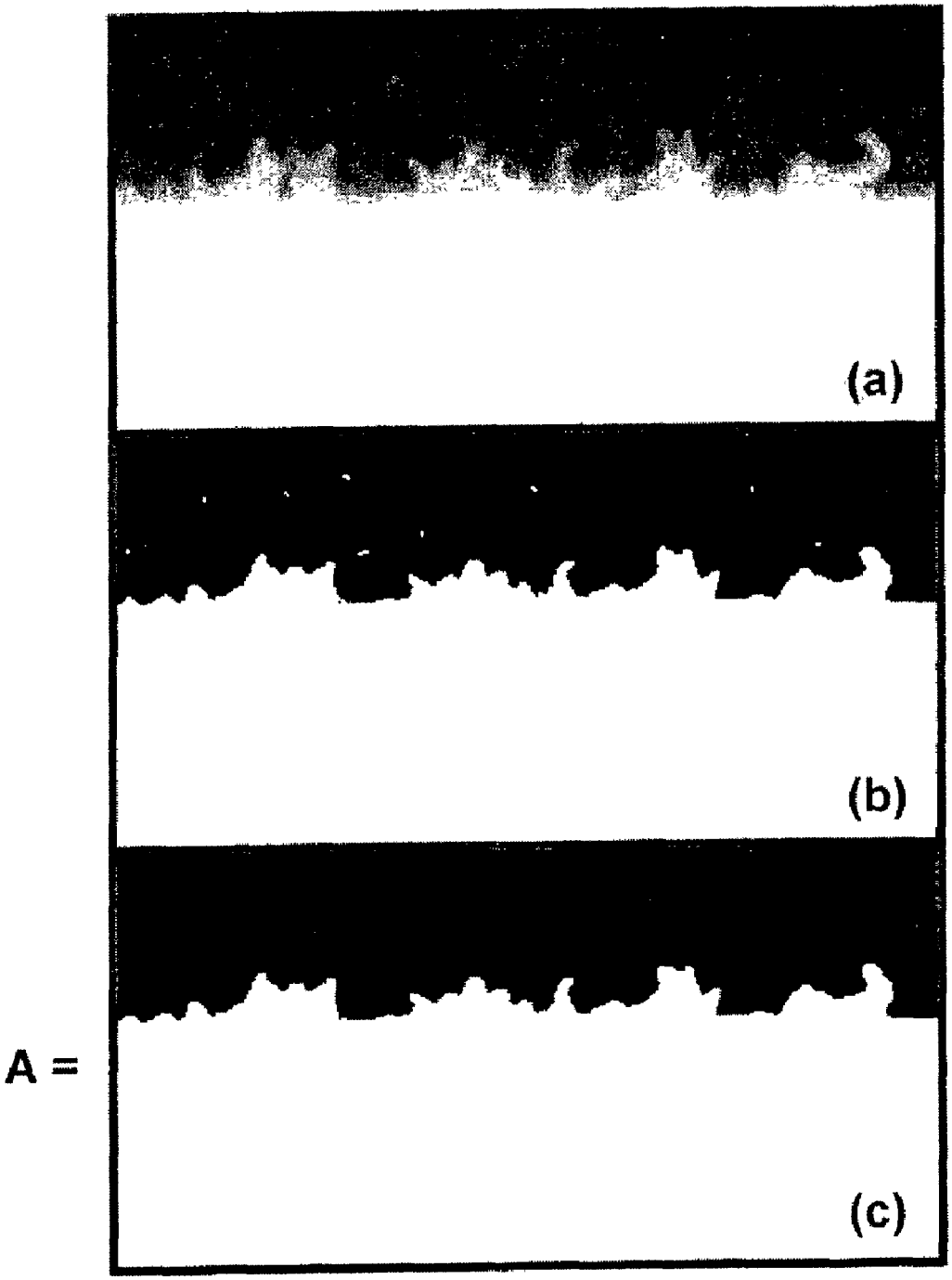
FIGS. 11(a), (b), and (c) show original, binary and despeckled images, respectively, using an enhancement process from the digital view of FIG. 10.

An image processing technique is used to extract the interface contours from the captured digital images. The captured images need initial enhancements before further contour extraction. FIG. 11 shows the enhancement process for a small region of the digital image.

The image conditioning and enhancement process is: (a) original image, (b) binary image, and (c) de-speckled image.

In the first step, the brightness and contrast of the original image is enhanced and then it is converted to binary (0's and 1's) as shown in FIG. 11(b). The speckles in the dark region are simply removed by a morphological opening process (See FIG. 11(c)). See J. C. Russ, "The Image Processing Handbook", CRC Press, Boca Raton (1992). This de-speckled image is now ready for the contour extraction.

The fracture interface contour at this point is represented by the interface between the white and dark regions. This interface is easily extracted by further morphological processing of the image in FIG. 11(c). Assume a symbol A represents the image in FIG. 11(c). This image is subjected to the erosion process (see J. C. Russ, "The Image Processing Handbook", CRC Press, Boca Raton (1992)), which is then called image B. The erosion process simply removes a single layer from the white regions of the image that have common interface with the dark regions. The eroded image B is shown in FIG. 12. Now, the only difference between the image A and B is the fracture interface, which is absent in B.

The interface image is extracted by subtracting the image B from A as shown in FIG. 13(a) (image C). Inverting image C generates the fracture interface image D.

The fracture interface in image D is converted to a profile h(x) by a raster-to vector algorithm. This profile is then corrected for any linear trend and called g(x). The roughness value for this profile is then calculated from: rms=square root of $(g(x)-\langle g\rangle)^2$ where rms is the root mean square (which is a measure of the interface roughness), and <.> is a simple average over the whole data set.

4. Examples

As an example, three different pictures are captured from the fracture interface of a product of this disclosure. FIG. 14 shows the original pictures taken by the optical microscope. Using the algorithm set forth above, the fracture interface roughness is calculated.

FIG. 15 represents the fracture interface contour extracted from the digital images. The rms values for these three interfaces are also given in this figure. The straight lines in this graph are the linear trends in the data, which is used for corrections and obtaining the profile g(x). The interface roughness values for this particular product is 61.31±6 microns, which is calculated by averaging these three values.

5. Test Results

Using the roughness analysis method described above, tests were conducted on various prior art paper constructions and various constructions of the Invention and the following average rms and (rms standard deviation) measurements were determined: Avery Maxell CR-2SA4LX4-glossy-long cut direction—32.4 (9.1); Avery Maxell CR-2SA4LX4-glossy-short cut direction—24.4 (7.7); Avery Inkjet microperfed business cards—73.4 (9.6); Invention matte-Inkjet coated (IJC)-long cut—29.3 (6.7); Invention matte IJC-short cut—23.1 (8.5); Invention glossy IJC-long cut—20.5 (3.3); Invention glossy IJC-short cut—19.9 (5.5); Invention uncoated laser-long cut—10.9 (2.2); and Invention uncoated laser-short cut—2.6 (0.7). All samples were folded toward the printable face first, then folded back and forth as necessary to break. The cut directions on the sheet are indicated above. And the "Avery Maxell" is existing photosheet paper with die cuts. As can be seen the Invention resulted in significantly smoother edges.

6. CONCLUSIONS

Thus, a new method is set forth above in order to quantify the interface optical roughness of the product. This method is based on optical microscopy and further image processing and calculations. The interface roughness is reported as a single value (rms). These data can be used for the comparison as well as checking the quality of the product. However, since this method is based on optical processing of the samples, the optical roughness values do not include the smoothness-to-touch of the fracture interface. To include the hardness and sharpness of the interface, this method needs to be further developed and perhaps to be combined with other test methods.

Thus, from the foregoing detailed description, it will be evident that there are a number of changes, adaptations and modifications of the present invention that come within the province of those skilled in the art. The scope of the invention includes any combination of the elements from the different species, embodiments, functions and/or subassemblies disclosed herein, as would be within the skill of the art. It is intended that all such variations not departing from the spirit of the inventions be considered as within the scope thereof.

What is claimed is:

1. A card sheet comprising:

a top sheet having a front side and a back side;

carrier material attached to the back side in a manner so as to prevent separation of the top sheet from the carrier material;

the carrier material including a polymer layer and a tie layer;

the tie layer being ethylene vinyl acetate;

at least one cut line through the top sheet to form at least a portion of a perimeter of a card;

the carrier material having stress and elongation properties such that after the card sheet has been passed through a printer or copier and desired indicia printed on the front side or on a coating on the top sheet, the card sheet can be folded forward with a single folding action to snap break the carrier material snap along one of the cut lines to form an edge of a separate or separable printed card whose bottom surface is formed by a portion of a bottom surface of the card sheet; and the card sheet being contact adhesive free between the top sheet and the carrier material.

2. The card sheet of claim 1 wherein the single folding action is between 45 and 165 degrees.

3. The card sheet of claim 1 wherein the top sheet is paper.

4. The card sheet of claim 1 wherein the polymer layer includes a polymer selected from the group of polymethylpentene, polyolefins, polyesters, polypropylene, polyethylenes, copolymers of propylene and ethylene, polymethyl methacrylate, polystyrene, and compatible mixtures thereof.

5. The card sheet of claim 1 wherein the polymer layer defines a first polymer layer and the carrier material includes a second polymer layer.

6. The card sheet of claim 5 wherein the tie layer is between the first and second polymer layers.

7. The card sheet of claim 5 wherein the first polymer layer is polymethylpentene and the second polymer layer is polyolefin.

8. The card sheet of claim 1 wherein the top sheet defines a first top sheet, and farther comprising a second top sheet applied to the back side of the carrier material.

9. The card sheet of claim 8 wherein the second top sheet is printable.

10. The card sheet of claim 8 further comprising a layer which can be printed with at least one of an inkjet printer or a laser printer, on the side of the carrier material opposite to the top sheet.

11. The card sheet of claim 1 wherein the at least one cut line does not penetrate into the carrier material.

12. The card sheet of claim 1 wherein the polymer layer comprises polymethylpentene and the top sheet is cardstock.

13. The card sheet of claim 1 wherein the polymer layer includes a crystallized polymer.

14. The card sheet of claim 1 wherein the polymer layer includes a semi-crystalline polymer.

15. The card sheet of claim 1 wherein the polymer layer includes a polymer and a nucleating agent.

16. The card sheet of claim 1 wherein the top sheet is a card sheet.

17. The card sheet of claim 1 wherein the top sheet has a photoreceptive surface.

18. The card sheet of claim 1 wherein the polymer layer is extruded onto the back side.

19. The card sheet of claim 1 wherein the card sheet has a thickness of 7-15 mils.

20. A card sheet comprising:

a top sheet;

the top sheet being cardstock and having a front side and a back side;

a polymethylpentene polymer carrier layer extruded directly onto the back side in a manner so as to prevent separation therefrom;

at least one cut line through the top sheet to form at least a portion of a perimeter of a card;

the polymer carrier layer having stress and elongation properties such that after the sheet has been passed through a printer or copier and desired indicia printed on the front side or on a coating on the top sheet, the sheet can be folded forward with a single folding action so that the polymer carrier layer snap breaks along one of the at least one cut line to form a separate or separable printed card whose bottom surface is formed by a portion of a bottom surface of the card sheet; and the card sheet being contact adhesive free between the top sheet and the carrier layer.

21. The card sheet of claim 20 wherein the polymer carrier layer is directly coated onto the back side by extrusion.

22. The card sheet of claim 20 wherein the top sheet defines a first top material, and further comprising a second top material applied to the back side of the polymer carrier layer.

23. The card sheet of claim 22 wherein the second top material is printable.

24. The card sheet of claim 20 further comprising a layer which can be printed with at least one of an inkjet printer or a laser printer, on the side of the polymer carrier layer opposite to the top sheet.

25. The card sheet of claim 20 wherein the at least one cut line does not penetrate into the polymer carrier layer.

26. The card sheet of claim 20 wherein the polymer carrier layer includes a crystallized polymer.

27. The card sheet of claim 20 wherein the polymer carrier layer includes a semi-crystalline polymer.

28. The card sheet of claim 20 wherein the polymer carrier layer includes a polymer and a nucleating agent.

29. The card sheet of claim 20 wherein the top sheet is a card sheet.

30. The card sheet of claim 20 wherein the top sheet has a photoreceptive surface.

31. The card sheet of claim 20 wherein the card sheet has a thickness of 7-15 mils.

32. A card sheet comprising:

a cardstock top sheet having a front side and a back side;

a polymer layer extruded directly onto the back side in a manner so as to prevent separation therefrom;

cut lines through the top sheet to form at least a portion of a perimeter of a card;

the polymer layer having stress and elongation properties such that after the card sheet has been passed through a printer or copier and desired indicia printed on the front side or on a coating on the top sheet, the card sheet can be folded forward with only a single folding action whereby the polymer layer snap breaks along one of the cut lines to form an edge of a separate or separable printed card whose bottom surface is formed by a portion of a bottom surface of the card sheet; and the card sheet being contact adhesive free between the top sheet and the polymer layer.

33. The card sheet of claim 32 wherein the polymer layer includes at least one of ethylene vinyl acetate or polypropylene.

34. The card sheet of claim 32 wherein the top sheet defines a first top sheet and further comprising a second top sheet on the polymer layer on a side thereof opposite to the first top sheet.

35. The card sheet of claim 34 wherein the first and second top sheets are made of the same material.

36. The card sheet of claim 34 wherein the faces of the first and second top sheets are printable.

37. The card sheet of claim 32 wherein the card sheet has a thickness of 7-15 mils.

38. A card sheet comprising:

a top sheet having a front side and a back side;

carrier material attached to the back side in a manner so as to prevent separation of the top sheet from the carrier material;

the carrier material including a polymer layer and a tic layer;

the tie layer being selected from the group of anhydride modified polypropylene, anhydride modified polyethylene, anhydride modified ethylene vinyl acetate, anhydride modified ethyl methyl acrylate, anhydride modified ethyl acrylic acid, and copolymers and mixtures thereof;

at least one cut line through the top sheet to form at least a portion of a perimeter of a card;

the carrier material having stress and elongation properties such that after the card sheet has been passed through a printer or copier and desired indicia printed on the front side or on a coating on the top sheet, the card sheet can be folded forward with a single folding action to snap break the carrier material snap along one of the cut lines to form an edge of a separate or separable printed card whose bottom surface is formed by a portion of a bottom surface of the card sheet; and the card sheet being contact adhesive free between the top sheet and the carrier material.

39. The card sheet of claim 38 wherein the single folding action is between 45 and 165 degrees.

40. The card sheet of claim 38 wherein the top sheet is paper.

41. The card sheet of claim 38 wherein the polymer layer includes a polymer selected from the group of polymethylpentene, polyolefins, polyesters, polypropylene, polyethylenes, copolymers of propylene and ethylene, polymethyl methacrylate, polystyrene, and compatible mixtures thereof.

42. The card sheet of claim 38 wherein the polymer layer defines a first polymer layer and the carrier material includes a second polymer layer.

43. The card sheet of claim 42 wherein the tie layer is between the first and second polymer layers.

44. The card sheet of claim 42 wherein the first polymer layer is polymethylpentene and the second polymer layer is polyolefin.

45. The card sheet of claim 38 wherein the top sheet defines a first top sheet, and further comprising a second top sheet applied to a back side of the carrier material.

46. The card sheet of claim 45 wherein the second top sheet is printable by a printer or copier.

47. The card sheet of claim 38 further comprising a layer which can be printed with at least one of an inkjet printer or a laser printer, on a side of the carrier material opposite to the top sheet.

48. The card sheet of claim 38 wherein the at least one cut line does not Penetrate into the carrier material.

49. The card sheet of claim 38 wherein the polymer layer includes a crystallized polymer.

50. The card sheet of claim 38 wherein the polymer layer includes a semi-crystalline polymer.

51. The card sheet of claim 38 wherein the polymer layer includes a polymer and a nucleating agent.

52. The card sheet of claim 38 wherein the top sheet is a card sheet.

53. The card sheet of claim 38 wherein the top sheet has a photoreceptive surface.

54. The card sheet of claim 38 wherein the polymer layer is extruded directly onto the back side.

55. The card sheet of claim 38 wherein the card sheet has a thickness of 7-15 mils.

56. A card sheet, comprising:

a top sheet having an inkjet or laser print-receptive front side and a back side;

a polymer carrier layer directly on the back side in a manner so as to prevent separation from the top sheet;

first and second horizontal cut lines and first and second vertical cut lines, all of the cut lines extending through the top sheet and defining the entire perimeter of a rectangular card having card first, second, third and fourth edges;

the polymer cater layer having stress and elongation properties such that after the card sheet has been passed through a printer or copier and desired indicia printed on the card sheet, the card sheet is capable of snap-breaking with only a single fold such that the polymer carrier layer snap breaks along a first one of the cut lines to form the card first edge, is capable of snap-breaking with only a single fold such that the polymer cater layer snap breaks along a portion of a second one of the cut lines to form the card second edge, is capable of snap-breaking with only a single fold such that the polymer carrier layer snap breaks along a portion of a third one of the cut lines to form the card third edge, and is capable of snap-breaking with only a single fold such that the polymer cater layer snap breaks along a portion of a fourth one of the cut lines to form the card fourth edge;

a bottom surface of the card is formed by a portion of a bottom surface of the card sheet; and the card sheet being contact adhesive free between the top sheet and the cater layer.

57. The card sheet of claim 56 further comprising a printable layer on a back side of the polymer carrier layer, and the printable layer including a bottom laser or inkjet print-receptive surface that is printable by the printer or copier when the card sheet is passed through the printer or copier.

58. The card sheet of claim 57 wherein the printable layer has an inkjet or laser print-receptive bottom coat which forms the bottom laser or inkjet print-receptive surface.

59. The card sheet of claim 56 wherein the top sheet includes an inkjet or laser print-receptive top coat.

60. The card sheet of claim 56 wherein the polymer carrier layer has a multi-layer construction.

61. The card sheet of claim 56 wherein the single fold is a single forward fold toward the front side.

62. The card sheet of claim 56 wherein the polymer carrier layer includes a crystalline polymer.

63. The card sheet of claim 56 wherein the polymer carrier layer includes a semi-crystalline polymer.

64. The card sheet of claim 56 wherein the polymer carrier layer includes a nucleating agent.

65. The card sheet of claim 56 wherein the polymer carrier layer includes a polymer having a filler.

66. The card sheet of claim 56 wherein the top sheet is a paper card sheet.

67. The card sheet of claim 56 wherein the single fold is a single folding action between 45 and 165 degrees.

68. The card sheet of claim 56 wherein the printed card is a business card.

69. The card sheet of claim 56 wherein the polymer carrier layer is extruded directly on the back side.

70. The card sheet of claim 56 wherein the polymer carrier layer includes a polymer selected from the group of polymethylpentene, polyolefins, polyesters, polypropylene, polyethylenes, copolymers of propylene and ethylene, polymethyl methacrylate, polystyrene, ethylene vinyl acetate, vinyl acetate and compatible mixtures thereof.

71. The card sheet of claim 56 wherein the polymer carrier layer comprises polymethylpentene and the top sheet is cardstock.

72. The card sheet of claim 56 wherein the cut lines include die cut lines.

73. The card sheet of claim 56 wherein the polymer carder layer has a thickness of between 25 μm and 70 μm.

74. The card sheet of claim 56 wherein the top sheet has a thickness of between 150 μm and 250 μm.

75. The card sheet of claim 56 wherein the cut lines do not penetrate the polymer carrier layer.

76. The card sheet of claim 56 wherein the top sheet has a thickness of eight to ten mils.

77. The card sheet of claim 56 wherein the front side is an inkjet print-receptive front side.

78. The card sheet of claim 56 wherein the card sheet has a thickness of 7-15 mils.

* * * * *